Dec. 18, 1951  D. V. EDWARDS  2,578,679
INDUCTION ALTERNATOR EXCITER CONTROL
Filed July 25, 1947                                         8 Sheets-Sheet 1
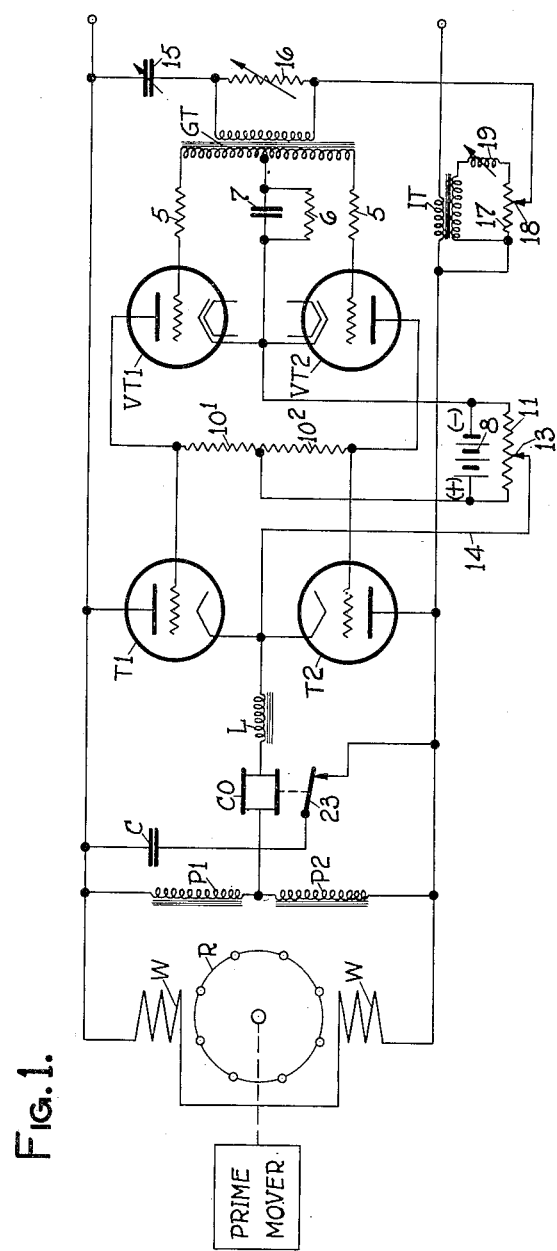
Fig. 1.
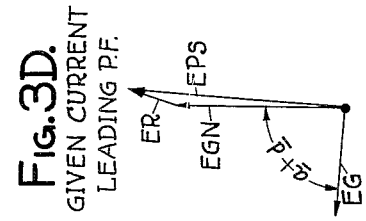
Fig. 3D.
GIVEN CURRENT LEADING P.F.
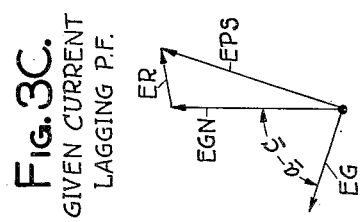
Fig. 3C.
GIVEN CURRENT LAGGING P.F.
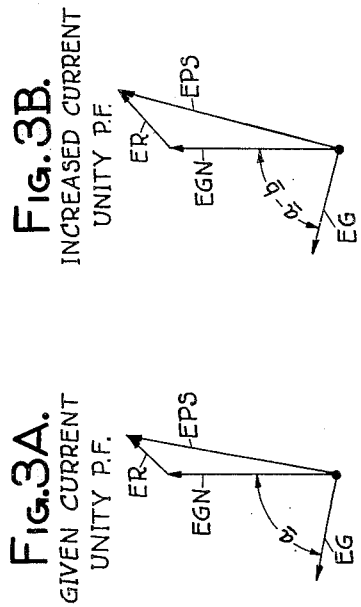
Fig. 3B.
INCREASED CURRENT UNITY P.F.
Fig. 3A.
GIVEN CURRENT UNITY P.F.
Inventor
D. V. Edwards,
Neil A. Preston,
his Attorney

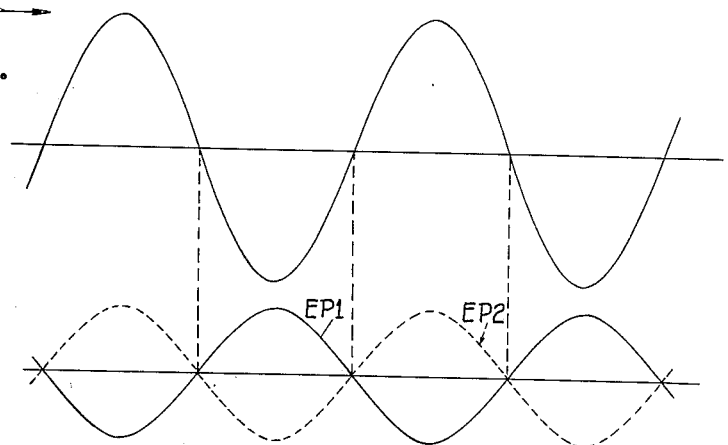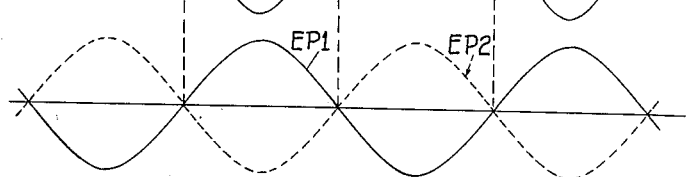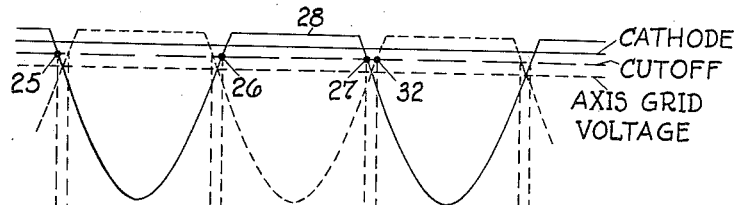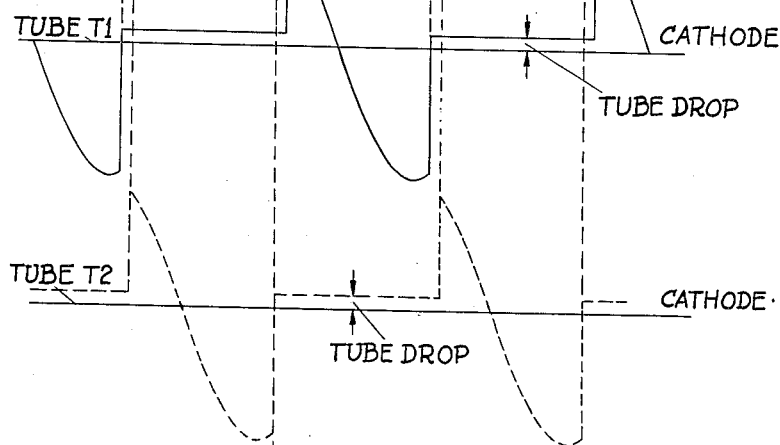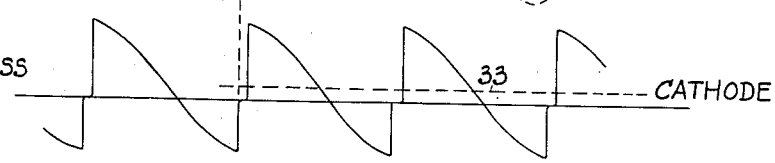

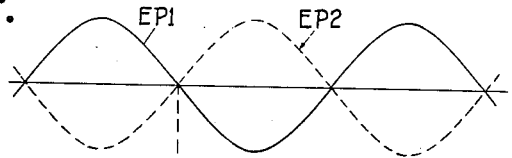
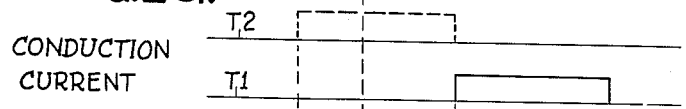
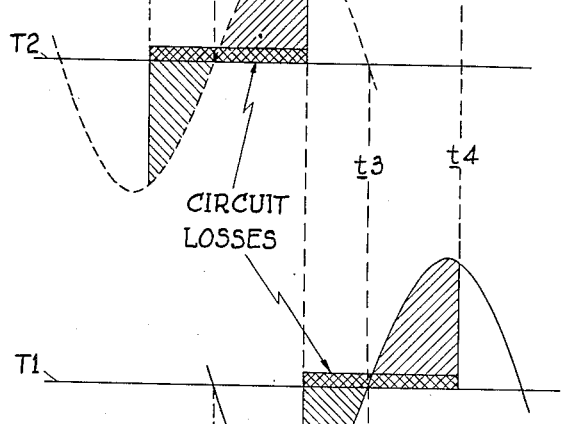
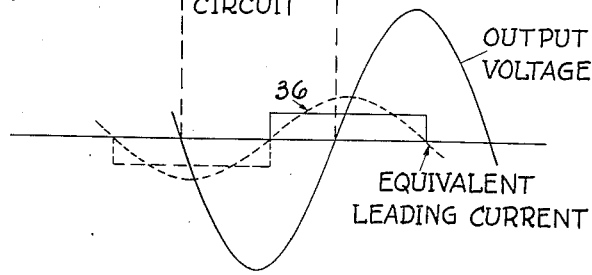

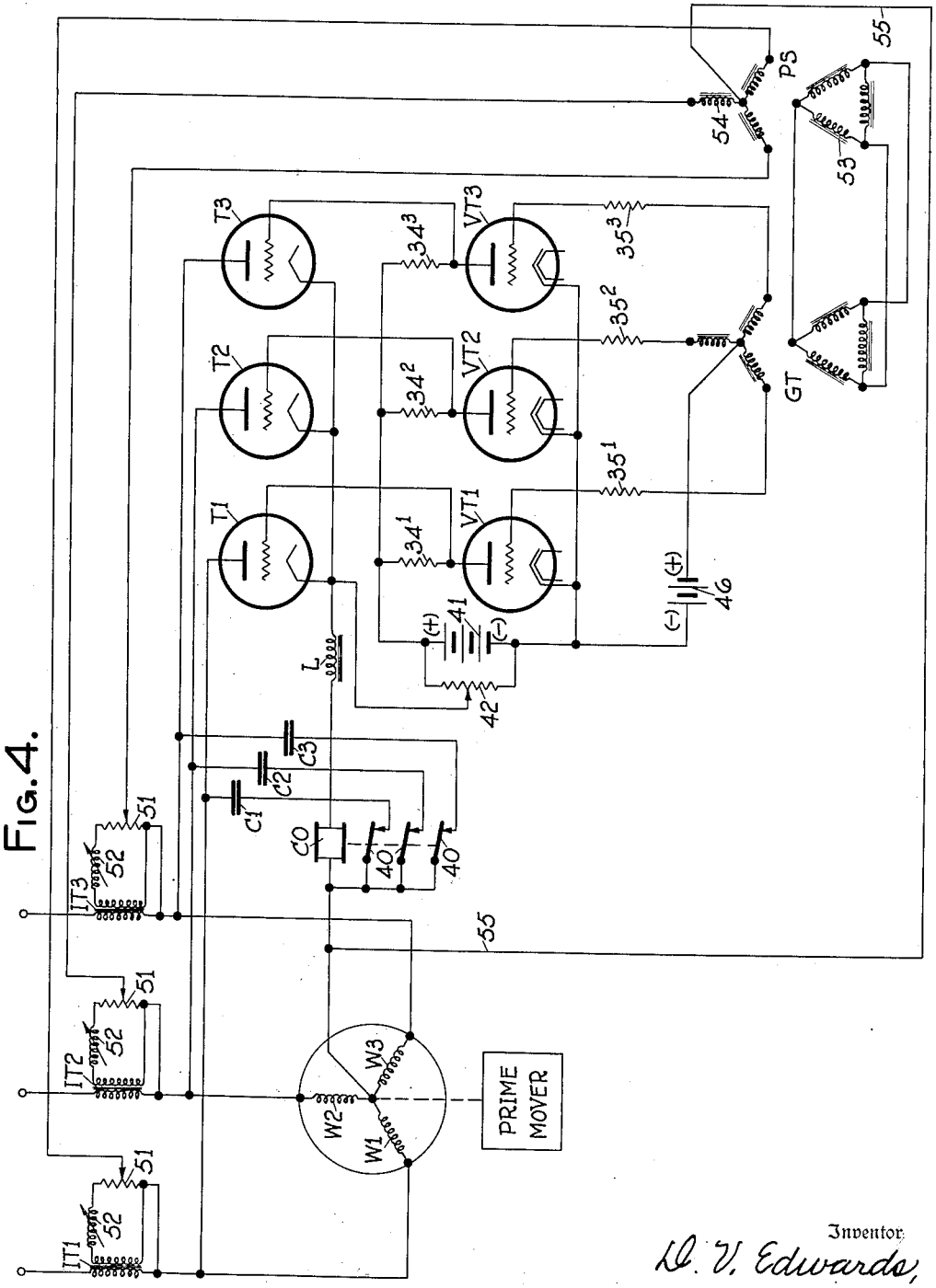

Dec. 18, 1951  D. V. EDWARDS  2,578,679
INDUCTION ALTERNATOR EXCITER CONTROL
Filed July 25, 1947  8 Sheets-Sheet 5
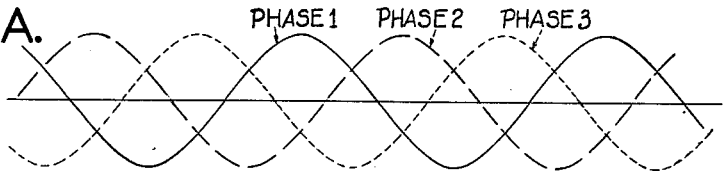
FIG. 5A.
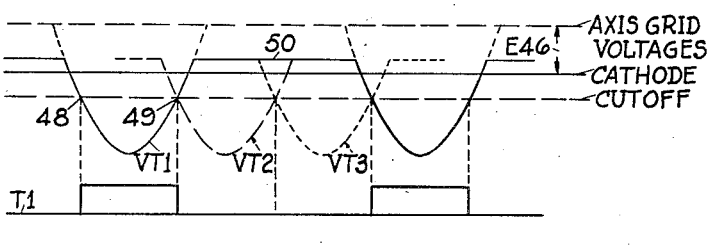
FIG. 5B.
GRID VOLTAGES
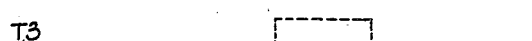
FIG. 5C.
CONDUCTION CURRENTS
FIG. 5D.
POWER TRANSFER
TUBE T1
TUBE T2
TUBE T3
Inventor
D. V. Edwards,
Neil W. Preston,
his Attorney Dec. 18, 1951      D. V. EDWARDS      2,578,679
INDUCTION ALTERNATOR EXCITER CONTROL
Filed July 25, 1947      8 Sheets-Sheet 6

Inventor
D. V. Edwards,
Neil W. Preston,
his Attorney

Patented Dec. 18, 1951

2,578,679

UNITED STATES PATENT OFFICE 2,578,679

INDUCTION ALTERNATOR EXCITER CONTROL

Donald V. Edwards, Montclair, N. J., assignor to General Railway Signal Company, Rochester, N. Y.

Application July 25, 1947, Serial No. 763,534

27 Claims. (Cl. 322—20)

This invention relates to excitation apparatus for alternating current generators, and more particularly to exciting circuit organizations for induction generators, permanent magnet alternators, and the like.

Considering, for example, an alternating current generator of the induction type, sometimes termed an asynchronous alternator, this machine structurally is a conventional induction motor which has its rotor driven by a suitable form of prime mover above the synchronous speed at which it would operate as a motor at the operating frequency. Although such an induction alternator is rugged in construction, has relatively low initial and upkeep costs, gives a good sinusoidal wave form, and has a rotating element which can be rotated at relatively high speeds, this type of alternator has heretofore been greatly limited in its practical application, primarily on account of the auxiliary machines required for its excitation and its poor voltage regulation under varying loads. An induction motor operated above synchronous speeds to act as an induction alternator will deliver power to an external load circuit connected to its stator windings, provided the load circuit supplies the necessary exciting current to magnetize it, which is a leading current with respect to the terminal voltage of the generator. Since an induction alternator requires such a leading current for its excitation, and loses its output voltage unless the load circuit affords such component of leading current for excitation, the usual limited application for this type of generator has been in parallel with another synchronous alternator, which supplies leading current to balance all of the lagging current called for by the load, and also the additional current which is lagging with respect to its terminals but leading with respect to the terminals of the induction generator, to provide the necessary exciting or magnetizing current for the induction alternator. Such an arrangement has the disadvantage that the frequency and voltage output of the induction alternator is not dependent upon its speed or machine constants, but rather upon the separate synchronous alternator and the power factor of the connected system, so that this type of alternator, in spite of the structural advantages, has had a limited practical use.

It has been proposed to operate an induction alternator as an isolated or independent machine by supplying its exciting or magnetizing current from capacitors connected across the terminals of the machine; but this organization has not had much practical application, on account of the size and cost of the capacitors required, and also because of the wide variations in output voltage under varying load conditions for any given speed and fixed value of capacitor. In order to maintain a reasonably uniform output voltage, the capacitors used with the machine would have to be constantly adjusted, because each change in the power factor of the load would vary the effective magnetic field of the stator and the output voltage for the same rotor speed.

Similar variations of output voltage and poor voltage regulation under varying loads is also characteristic of the permanent magnet type of alternator, since the magnitude and phase relation of the load current in the stator windings has a demagnetizing action which changes the voltage generated for the same operating speed. The solid metal of a permanent magnet rotor may be preferable under some conditions to the laminated rotor structure of an induction alternator, especially where extremely high rotational speeds for the rotor are desirable.

In view of these considerations, the primary object of this invention is to provide a system or organization of excitation apparatus for induction alternators, permanent magnet generators and the like, which will act to supply the appropriate magnetizing current from the output or load circuit of the generator in such a manner that this exciting current may be readily controlled and varied as required for the varying load conditions.

Generally speaking, and without attempting to define the nature and scope of the invention, it is proposed to provide a circuit organization employing electron discharge tubes, which enables the conduction periods of these tubes to be appropriately controlled and to cooperate with a relatively large inductance to supply to the stator windings of the induction alternator, permanent magnet generator, or the like, from its own output circuit the appropriate component of leading current to afford the desired excitation of the generator to give a substantially constant output voltage under varying load conditions.

Various other characteristic features, attributes, and advantages of the invention will be in part apparent and in part pointed out as the description progresses.

The accompanying drawings illustrate in a simplified and diagrammatic manner certain specific embodiments of the invention, together with explanatory graphs or curves, the parts and circuits being illustrated more with the view of facilitating an explanation and understanding of the nature and scope of the invention, than for the purpose of illustrating the particular construction and arrangement of parts preferably employed in practice.

In the accompanying drawings,

Fig. 1 illustrates one embodiment of the invention applied to a single phase induction alternator;

Figs. 2A to 2J illustrate representative graphs or curves of certain of the circuits and voltages of the organization of Fig. 1;

Figs. 3A to 3D are vector diagrams for facilitating an explanation of the automatic voltage regulating features of the exciting circuit organization of this invention;

Fig. 4 is a schematic diagrammatic representation of another embodiment of the invention applied to a three-phase induction alternator;

Figs. 5A to 5D are explanatory graphs or curves for the modified arrangement of Fig. 4;

Figure 8:
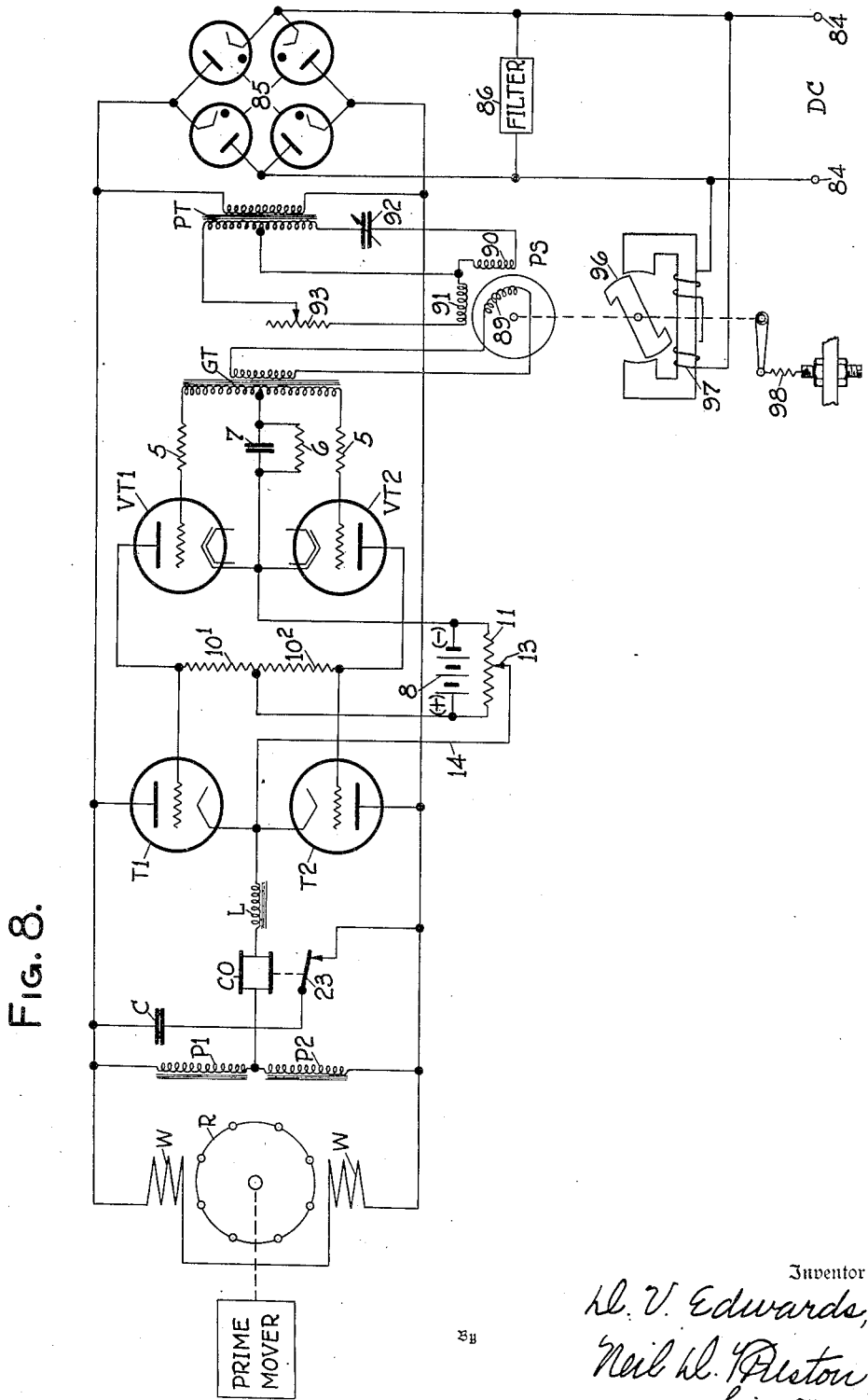
Figure 9:
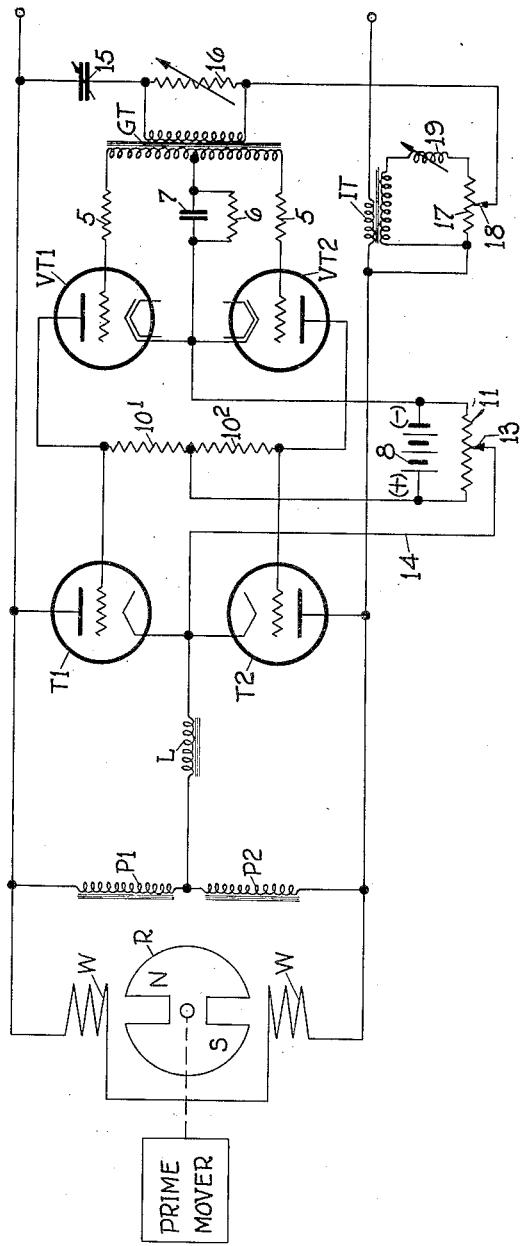

Fig. 8 illustrates a modified organization in in which the output of the generator is rectified to supply current to a direct current load circuit, and the excitation of the generator is controlled to provide a constant direct current voltage; and Fig. 9 illustrates schematically the exciting circuit organization of the invention applied to an alternating current generator of the permanent magnet type.

While the excitation apparatus of this invention may be employed in connection with alternating current generators of the types commonly known as induction generators, and magnetoelectric or permanent magnet type generators, or with other types of generating equipment where it is desired to supply to the stator or armature windings a controllable component of leading current derived from the output of the generator, one typical embodiment of the invention illustrated in Fig. 1 assumes a single phase induction generator having the usual stator and rotor structures of an induction motor. The usual distributed windings for the stator are indicated conventionally at W; and the rotor R shown schematically is assumed to be driven by a suitable prime mover, illustrated conventionally in block form, at the appropriate speed for the desired output frequency. This prime mover may be of any suitable type; but since the output frequency of an induction generator depends upon the slip which increases with increase in load, it is contemplated that for situations where a constant output frequency under varying loads is desired, suitable speed regulating means responsive to frequency will be provided for the prime mover, so as to cause its speed to increase when increases in load change the slip and output frequency. Any suitable frequency responsive speed governor may be used for this purpose; and under some conditions it may not be expedient to attempt to maintain a stable output frequency, as for example, when the alternating current output is rectified to supply current to a direct current load. In such a situation, the speed of the prime mover and variations in the frequency of the generator are not material; and as later explained, the excitation apparatus of this invention may be controlled to give a uniform direct current voltage, rather than a particular alternating current voltage at some regulated frequency.

The exciting or magnetizing current during operation is supplied to the stator winding W of the induction generator by the circuit organization of this invention, which comprises two electron discharge tubes T1 and T2 of the power type. Since the detailed structure of these tubes is not material to this invention, assuming of course the appropriate operating characteristics, the usual anode, control element or grid, and cathode for each tube are illustrated conventionally. As shown, the cathodes for these tubes are assumed to be of the directly heated type; and the heating current for these cathodes may be supplied from any suitable source, preferably from a heater transformer (not shown) connected to the output circuit of the generator and provided with a center tap on its secondary winding for the connection of the inductor L, in accordance with well known practice.

These tubes T1 and T2 are of the hard vacuum type, as distinguished from a gas discharge tube, since in accordance with this invention, as later explained, their control elements or grids must be capable of stopping conduction through the tube while its anode voltage is positive, as well as starting conduction through the tube. Also, in the circuit organization characteristic of this invention, the anode to cathode voltage for the tubes T1 and T2 is relatively low and uniform during their conduction periods; and it is desirable to employ tubes which will satisfy the power requirements under such conditions. Power triodes of the conventional type may be employed in many situations to conduct the amount of exciting current required at the anode to cathode voltage existing during the conduction periods, without prohibitive grid circuit losses; but in other situations, particularly where relatively large exciting currents are required, it is proposed to use an electron discharge tube of the high vacuum type, conveniently termed a magnatriode, which is provided with a cross-magnetizing magnetic field to prevent elecron current to the control element or grid of the tube in spite of its relatively high positive potential. A tube of this magnatriode type is disclosed and claimed in other applications, such as the application of J. H. Burnett, Ser. No. 647,007, filed February 12, 1946, now Patent 2,543,739; and while a magnatriode is a highly desirable element of the combination of this invention for many situations, no claim is made herein to the structure and operating characteristics of such type of tube.

Various specific circuit arrangements may be employed for associating the power tubes T1 and T2 with the stator winding W of the induction alternator for the purposes of this invention. In the particular circuit arrangement illustrated in Fig. 1, an autotransformer, having a center-tapped connection and constituting in effect two primary windings P1 and P2, is connected across the stator winding W. These primary windings P1 and P2 are included in the anode circuits of tubes T1 and T2, in series with a relatively large inductance L, as can be readily understood from the drawings without detailed explanation of the circuit connections.

The control elements or grids of the power tubes T1 and T2 are governed by a suitable phase shifting grid control means such that these tubes may be rendered fully conductive and non-conductive alternately in a phase relation to the output voltage of the generator which may be set and adjusted as required. Various types of phase shifting means and grid control means for the power tubes T1 and T2 may be employed for this purpose. In the particular arrangement shown in Fig. 1, additional pilot or control tubes VT1 and VT2 are employed to provide an abrupt change in the grid potentials of the power tubes T1 and T2 between a negative cutoff value and a value suitable for full conduction, assumed to be positive. These control tubes VT1 and VT2 are hard vacuum triodes of any suitable type having the appropriate operating characteristics, and may be included in one envelope. The grids of the control tubes VT1 and VT2 are connected in series with grid resistors 5 to the opposite terminals of the secondary of a grid transformer GT having a center tap connected to the cathodes of said tubes, preferably with a grid leak resistor 6 and capacitor 7 to provide an automatic negative bias for the grids of these tubes, for reasons later explained. A suitable source of direct current, shown as a battery 8, provides anode current for the control tubes VT1 and VT2 through load resistors $10^1$, $10^2$ of relatively high resistance. A resistor 11 across this battery 8, an adjustable slider 13, together with the circuit connections readily seen on the drawings, enables a selected portion of the voltage of the battery 8 to be used to provide an appropriate positive potential on the grids of each of the power tubes T1 and T2 when its associated control tube VT1 or VT2 is not conducting.

The primary of the grid transformer GT is supplied with an alternating current voltage derived from the terminals of the generator in a phase relation to this voltage determined by the setting of a suitable phase shifting device, and by the action of an automatic voltage regulating device. In the arrangement shown in Fig. 1, the fixed phase shift is provided by a capacitor 15 and a resistor 16, and the automatic phase shift for voltage regulation by a current transformer IT and associated circuit elements. This current transformer IT is of the usual type and construction commonly used for instrumentation purposes in connection with power circuits, and has its primary in the output circuit of the generator. The secondary circuit of this current transformer IT includes a load resistor 17 with an adjustable slider 18 and an inductance 19, also preferably adjustable. As the load current varies, the phase of the drop across the resistor 17 in the secondary circuit of the current transformer IT varies in the manner and for the purpose more conveniently discussed later in describing the operation.

A capacitor C connected across the stator winding W is provided for starting purposes only. This capacitor C need not be any larger than necessary to build up a generated voltage suitable for the anode circuits of the tubes T1 and T2, which serve to provide the exciting current required under operating conditions. In other words, the capacitor C enables the small voltage generated due to residual magnetism when rotation of the stator is started to be built up to a value suitable for providing conduction current through the tubes T1 and T2.

Since the capacitor C is required only for starting purposes in the organization of this invention, it is proposed to provide a capacitor large enough for the generator voltage to build up to a value suitable for heating the cathodes of the tubes T1 and T2 and provide some anode current through these tubes, and then disconnect this capacitor C and let the tubes take over and provide the exciting current for the full output voltage of the generator. In the particular arrangement illustrated, a cutout electro-responsive device in the form of a relay CO of a suitable type is included in the anode circuits of the tubes T1 and T2 in series with the inductor L; and when the tube exciting circuit starts to function, this relay CO is energized to open its contact 23 and break the circuit connecting the capacitor C across the windings W of the generator. Obviously, other expedients may be employed to disconnect the capacitor C when the tube exciting apparatus becomes effective. Also, if desired, the capacitor C may be left permanently connected across the windings of the generator; but such a capacitor would be relatively bulky and costly to stand the full output voltage of the generator, might tend to cause over-excitation of the machine if the load should draw a large leading current, and would involve unnecessary losses in this capacitor and its connections during normal operation of the machine.

Reviewing some of the elemental and well known characteristics of the induction type alternator, this machine structurally is the same as an induction motor, either single phase or polyphase; and for the purpose of analysis an induction alternator may be considered to be an induction motor having its rotor driven above the synchronous speed at which the machine would operate as a motor at the frequency of the output circuit connected to the stator windings. It may be said that whether the machine acts as a generator or a motor depends upon the speed of its rotor with respect to the rotating magnetic field provided by the existing excitation of its stator windings. If the rotor speed is less than the synchronous speed of the stator field, the machine operates as a motor; but if the rotor is driven above such synchronous speed, the machine becomes a generator. When acting as a generator, the rotor conductors may be considered as cutting the airgap flux provided by the stator, so that the instantaneous relative direction of the current in the rotor conductors is opposite to that for a motor; and hence the component of the current in the stator required to balance the de-magnetizing action of this rotor current becomes leading. In order that the machine may act as a generator and deliver power to an external load circuit, the current in this load circuit must have a leading component, otherwise no voltage is generated. Accordingly, induction generators are commonly operated in parallel with a separate synchronous generator capable of providing the leading magnetizing current required.

If the leading magnetizing current for the stator of an induction alternator is obtained from a capacitor, it is well known that the residual magnetism in the iron of the magnetic circuit through the stator builds up a small alternating current voltage as the rotor is turned. This small voltage applied to the capacitor, if this capacitor is of appropriate value with regard to the magnetization characteristics of the machine, results in the flow of a magnetizing current in the stator winding to increase the airgap flux, thereby increasing the generated voltage, and in turn the exciting current through the capacitor and airgap flux, and so on, until the terminal voltage of the machine builds up to a final value largely determined by the value of the capacitor and the saturation curve of the machine. For any given value of capacitor there is a predetermined open circuit generated voltage.

After the generated voltage of the induction generator has been built up by the starting capacitor C to a level suitable for operation of the power tubes T1 and T2, these tubes become conductive at periods, as later explained, such that a component of leading current is supplied to the stator winding W; and this causes the generated voltage to build up still farther until the desired operating value for operating conditions has been obtained. The excitation apparatus of this invention acts to provide the desired magnetizing current during this starting period in the same way as under steady state operating conditions; and in considering the functions and mode of operation of this apparatus, it is convenient to refer to the steady state conditions existing after the generator has developed its normal output voltage and is supplying power to a given load.

*Operation of excitation apparatus.*—Considering now the mode of operation of the embodiment of the invention shown in Fig. 1, it is helpful, in explaining the various factors involved, to consider the variations and time relations of certain voltages and currents; and for this purpose a series of graphs or curves illustrative of voltage and current conditions are shown in Figs. 2A to 2J. It should be understood that these curves or graphs are merely representative of typical operating conditions, and are presented for explanatory purposes only, not being intended to indicate any particular quantitative values, wave form or the like, and being somewhat idealized to facilitate illustration and explanation.

Considering the voltage and current relations for the excitation apparatus of this invention, and referring to the explanatory curves of Figs. 2A to 2J, the output voltage of the generator is an alternating or periodic voltage essentially sinusoidal in form, such as indicated in Fig. 2A. The voltages EP1 and EP2 across the transformer windings P1 and P2 with respect to their center tapped connection are in phase opposition and half the amplitude of the output voltage, as indicated in Fig. 2B. The anode circuits of the power tubes T1 and T2 include the transformer windings P1 and P2 and an inductor L of relatively large inductance, as can be readily understood from the drawings without detailed explanation of the circuit connections. In other words, the anode circuits of tubes T1 include the voltage across the inductor L and the respective voltages EP1 and EP2 of the transformer windings P1 and P2. For convenient reference the curves or graphs in Figs. 2B to 2J relating to the transformer winding P1 or its associated tube T1 are shown in solid lines, while those relating to the other transformer winding P2 and tube T2 are shown in dash lines.

Disregarding for the present the phase shifting features of the grid control means for the control tubes VT1 and VT2, assume that essentially sinusoidal voltages from the secondary of the grid transformer GT are applied to the grids of these tubes in some predetermined phase relation with respect to the generated output voltage, approximately as indicated in Fig. 2C of the explanatory diagrams, i. e. grid voltages which lead the anode voltages EP1 and EP2 for the power tubes T1 and T2 by a relatively large phase angle in the order of 88°. As the alternating voltages from the secondary of the grid transformer GT are applied to the grids of the tubes VT1 and VT2, the capacitor 7 and grid leak resistor 6 in the grid circuits of these tubes act in the usual and well known manner to establish a negative biasing voltage for these grids, which may be considered as corresponding to a shift of the axis of the grid control voltage to an extent such as indicated in Fig. 2C, that the grid of each of the control tubes VT1 and VT2 in turn is more negative than cutoff for slightly more than 180°, say 182°.

Considering for example the control tube VT1, which governs the conduction of the associated power tube T1, its voltage as shown in solid lines in Fig. 2C is beyond cutoff and stops conduction through this tube VT1 between points indicated at 25 and 26 in Fig. 2C, which are preferably slightly more than 180°, although much exaggerated in this respect in the interests of clarity. While the tube VT1 is not conducting, the grid of the associated power tube T1 assumes a potential for full conduction, assumed to be a positive potential, provided by reason of the circuit connections which may be traced in Fig. 1 from the grid of tube T1, load resistor $10^1$ for the control tube VT1, positive end of the resistor 11 associated with the battery 8, through the portion of this resistor cut in by the slider 13, and wire 14 to the cathode of tube T1. On the other hand, between the points indicated at 26 and 27 in Fig. 2C, the grid potential for the control tube VT1 is above cutoff, and this tube is conducting; and under these conditions the voltage drop in its load resistor $10^1$ changes the potential of grid of the associated power tube T1 to a negative value beyond the cutoff for this tube. In this connection, the positive potential on the grid of the control tube VT1 is limited by the voltage drop in its grid resistor 5 when the grid control voltage becomes positive and grid current flows, as indicated by the flat top for the positive portion of its grid voltage curve in Fig. 2C. The other control tube VT2 is governed in a similar manner to determine the conduction periods of the other power tube T2 with respect to the voltage EP2 in its anode circuit.

Thus, the power tubes T1 and T2 are rendered fully conductive alternately for slightly more than 180° in a phase relation to the output voltage of the generator determined by the phase relation of the voltage of the grid transformer GT with respect to said output voltage. The amplitude of the voltages from the secondary of the grid transformer GT are preferably selected to provide a rate of change of voltage near zero to shift quickly between cutoff and full conduction through the control tubes VT1 and VT2 in turn and cause such flow of current through their load resistors $10^1$, $10^2$ as will serve to change the potentials on the grids of the associated power tubes T1 and T2 abruptly between full conduction and cutoff. In this connection, it can be seen from the explanatory graphs of Figs. 2B and 2C that conduction periods of the power tubes T1 and T2 in the order of 88° leading, characteristic of this invention, require stopping conduction through a tube at a time when the voltage EP1 or EP2 in its anode circuit is near its maximum value, so that a high negative grid potential is required. For this reason, among others, it is considered preferable to employ pilot or control tubes VT1 and VT2 for governing the grid potentials of the power tubes T1 and T2.

As previously noted, it is preferred to provide conduction periods of the power tubes T1 and T2 of slightly more than 180°, so that each tube is not cut off until conduction through the other tube has been started. This slight overlapping of conduction periods of power tubes T1 and T2 is preferably employed, in order that there will always be a circuit for the inductor L through one tube or the other, and thereby avoid excessive and perhaps damaging voltages that might otherwise be generated by this inductor L, if the circuit through it were abruptly opened by stopping conduction through one tube before the other tube could conduct. During this period of overlap, current does not start to build up through the next or entering tube, in spite of the positive potential on its grid, since its anode is then negative, and current is not conducted by the entering tube until the leaving tube then conducting acts to shut off current through it by the control of its grid. In this connection, it may be pointed out that this slight overlapping of the conduction periods of the power tubes T1 and T2 merely represent one convenient way of avoiding generation of excessive voltages by the inductor L, and any other suitable expedient may be employed for this purpose without departing from the invention. Also, under some conditions and in some applications, the grid potentials of the tubes T1 and T2 may be influenced by anode voltage through electrode capacity to a degree that the provision of a definite overlap in the conduction periods of these tubes is not critical to avoid excessive voltages generated by the inductor L. Also, it may be explained that under some circumstances it is expedient to provide capacitors (not shown) across the transformer windings P1 and P2 to limit the voltage surges due to their inherent leakage reactance as conduction through the associated tubes T1 and T2 is cut off.

One significant feature of the excitation apparatus of this invention is the use of an inductor L of relatively large inductance in the anode circuits of the tubes T1 and T2. This inductor L is assumed to be of the usual and well known iron core type designed and constructed in accordance with established practice. Generally speaking, this inductor L acts like any inductance to generate a countervoltage of self-induction in opposition to voltages tending to increase current through it, and to convert energy stored in its magnetic circuit, so to speak, into a voltage tending to maintain current flow in the same direction and assist voltages tending to decrease such current. In this respect, the inductor L may be compared with a mechanical element of large inertia, which gradually acquires additional momentum when accelerated by an applied force in one direction, and may give up energy when subsequently decelerated by a reversal in the direction of the applied force.

Considering the effect of these elemental and well known characteristics of inductance L as applied to the circuit organization of this invention, when the conduction periods of the power tubes T1 and T2 are set to have a leading phase relation to the voltages in the respective transformer windings P1 and P2, approximately as indicated in Fig. 2C, it can be seen that during the latter part of the conduction period for the tube T2, terminating at the point indicated at 32 in Fig. 2C, the voltage EP2 of the transformer winding P2 in the anode circuit of this tube T2 is increasing in its positive value with respect to the center tap, and is providing voltage on the anode of tube T2 tending to increase current through the inductor L. The inductor L in generating a countervoltage to oppose such increases in current builds up magnetic flux in its core. When conduction through this tube T2 is cut off, and the circuit through the inductor L is shifted to the anode circuit for the other tube T1 including the other transformer winding P1, the voltage EP1 in this transformer winding has a negative value tending to decrease the current through the inductor L; but the decay of the magnetic flux stored in the core of the inductor L, as the current tends to decrease, generates a voltage in a direction to maintain this current, and opposes the voltage EP1 of the transformer winding P1 to give a positive voltage on the anode of the tube T1 during the first part of its conduction period. During the latter part of the conduction period of this tube T1, the voltage EP1 reverses and increases in its positive value, thereby in effect again storing magnetic flux in the core of the inductor L, ready to provide an anode voltage for the other tube T2 when it again becomes conductive.

It can be seen that under these conditions the voltage across the inductor rises and falls, and also changes in polarity, as the tubes T1 and T2 act alternately to connect the transformer windings P1 and P2 with the alternating voltage therein across the inductor L. Fig. 2E indicates generally and approximately the curve of voltage across the inductor L for the conditions assumed. In this connection, disregarding losses in the inductor, and assuming the line 22 in Fig. 2E represents the anode to cathode voltage for the tubes T1 and T2 under the conditions assumed, the voltage curve across the inductor L has such a shape that the areas above and below this line 33 are equal.

In order that each power tube T1 and T2 may conduct current during periods having a leading phase relation to the applied voltage in accordance with this invention, the inductance of the inductor L should be large enough to provide positive anode voltages for these tubes during the first part of their conduction periods in spite of the existing negative voltage in the associated transformer windings P1 and P2. Stated another way, the inductance of the inductor L should be at least large enough to maintain continuous current in the anode circuits of the tubes T1 and T2 throughout their conduction periods for the voltages and operating frequency of the generator. The quantitative value of a suitable inductance for this purpose will of course depend upon the operating conditions in each case; but the appropriate value of inductance to perform the desired functions may be readily determined by calculation or test.

Since the inherent characteristic of the inductor L is to tend to maintain an essentially uniform continuous current through it and through the power tubes T1 and T2 in turn while conducting, it may be considered that this inductor acts to generate such instantaneous voltages as are necessary to combine with the instantaneous voltages in the transformer windings P1 and P2 to give such uniform current. In accordance with this invention, the potentials of the grids of the power tubes T1 and T2 are essentially uniform for full conduction of these tubes throughout their conduction periods; and consequently the anode to cathode voltage or tube drop for conduction of the essentially uniform current called for by the inductor L is likewise uniform, so that the voltages across the respective tubes T1 and T2 are generally as indicated in Fig. 2D. For example, when the tube T1 is not conducting, the voltage across this tube corresponds with the combined voltages EP1 and EP2 of the transformer windings P1 and P2 less the tube drop of the other tube T2; and while the tube T1 is conducting, the tube drop voltage across it is essentially uniform, as indicated in Fig. 2D.

Thus, the organization of this invention as a power conversion device, including the inductor L and grid control means affording essentially uniform grid potentials for the power tubes T1 and T2 throughout their conduction periods, enables these power tubes to conduct a series of slightly overlapped blocks of current of essentially uniform amplitude, such as indicated in Fig. 2G. The phase relation of these blocks of current conducted by the tubes T1 and T2 with respect to the output voltage of the generator is predetermined and automatically adjusted in the manner and for the purpose later explained.

In this connection, the power tubes T1 and T2 operate at a high plate efficiency in the same way characteristic of power conversion devices of the same nature and type disclosed in my prior application, Ser. No. 734,965, filed March 15, 1947; and no claim is made herein to the organization including the power tubes T1 and T2 and their grid control means as a power conversion device alone, since such a power conversion device, although an important and highly desirable element in the combination of excitation apparatus of this invention, has a more general application and is claimed as such in other applications. With regard to this matter of high plate efficiency, it may be mentioned that the losses through the power tubes T1 and T2 are represented by the integration of the instantaneous voltages and currents through these tubes during their conduction periods; and on account of the prolonged conduction periods and the essentially uniform amplitude of these instantaneous voltages and currents, the tube losses are low, as compared with the tube losses in other power conversion devices, such as the well known Class C amplifier, where the conduction periods are relatively short and the instantaneous voltages and currents vary radically in amplitude.

In explaining how the exciting circuit apparatus of this invention serves to provide the desired component of leading current to the stator windings of the induction generator for its excitation from its own output circuit, it is convenient to refer to the curves or graphs in Figs. 2F to 2G, with the understanding that these curves are for explanatory purposes only and are not intended to be quantitatively accurate, nor applicable to the varying conditions existing in practice. The curves of Fig. 2F, which is a repetition of Fig. 2B for convenient reference, shows the alternating voltages in the transformer windings P1 and P2 due to the output voltage of the generator, and Fig. 2G indicates generally in the form of square blocks the current conducted by the power tubes T1 and T2 at a large leading phase angle with relation to these voltages EP1 and EP2, in the order of 88°.

Considering Figs. 2F and 2G, it can be seen that the voltages EP1 and EP2 in the anode circuits of the tbues T1 and T2 are negative during the first part of their respective conduction periods, and positive during the latter part of such conduction periods. For example, during the latter part of the conduction period of the tube T2, starting at a time indicated at t1, the voltage EP2 in its anode circuit is increasing in its positive value, and this voltage EP2 is acting to provide current in the direct current circuit including the inductor L, thereby storing energy in its magnetic circuit, so to speak. At the end of the conduction period of tube T2, indicated at the time t2, and during the first part of the conduction period of the next tube T1 until t3, the voltage EP1 in the anode circuit of this tube is changing in its negative value; and during this interval the inductor L is providing a voltage generated by the decay of magnetic flux in its core sufficiently greater than the instantaneous negative values of the voltage EP1 to maintain the anode of tube T1 positive to conduct the current, which the inductor L tends to maintain in the direct current circuit.

Thus, this circuit organization may be said to act as a rectifier for part of the half cycles, such as between the times indicated at t1 and t2, to supply current from the output voltage of the generator to the direct current circuit including the inductor L, and during another part of the half cycles such as between the times indicated at t2 and t3, to act as an inverter to commutate the voltage generated by the inductor to provide current pulses through the transformer windings P1 and P2 alternately to supply in effect an alternating current to the output circuit of the generator. Roughly speaking, the instantaneous power from the output circuit of the generator is transferred at certain times to the direct current circuit including the inductor L, and this power is utilized to return current to the output circuit of the generator at other times where it has the effect of a leading current.

Analyzing this action from another point of view, assume that conduction through the tubes T1 and T2 is starting at a leading phase angle somewhat less than 90° such as shown and continued for approximately 180°, and that the amplitude of the blocks of current conducted by these tubes is essentially uniform, as indicated in Fig. 2G. The product of the instantaneous currents and voltages during the conduction periods of these tubes will be approximately as shown by the shaded areas in Fig. 2H.

It will be noted that the area in Fig. 2H between t1 and t2 for the tube T2, during which power is being supplied from the output of the generator to the direct current circuit and inductor L, is greater than the area between t2 and t3 for the tube T1, during which power is being returned from the direct current circuit and inductor L to the output circuit of the generator. Hence there is a net transfer of power from the generator to the direct current circuit including the inductor L, in an amount which depends upon the leading phase angle, such as between t2 and t3, at which conduction through the tubes is started. Part of this net instantaneous power is required to supply the losses in the tubes T1 and T2 and in the effective resistance of the inductor L and transformer windings P1 and P2, such as indicated by the cross-hatched areas in Fig. 2H; and the remainder is available and effective to provide blocks of current through the transformer windings P1 and P2 alternately as the tubes T1 and T2 are rendered conductive.

If such blocks of current through transformer windings P1 and P2 during the conduction periods of the tubes T1 and T2 are considered in connection with the output voltage of the generator, as indicated in Fig. 2J, it can be seen that the effect of said blocks of current, except as to their wave form, corresponds with a sine wave of leading current, such as indicated by the dash line 36 in Fig. 2J. In other words, the blocks of current supplied to the output circuit of the generator by the action of the organization of this invention will correspond in effect upon the excitation of the generator by a component of leading current, such as would be supplied by a capacitor or the like. In this connection, it should perhaps be pointed out that, although the excitation is in the form of blocks of current, having substantial harmonic content, the generator itself, as well as the electrical characteristics of its output circuit, tends to modify the wave form of the current in the stator windings of the generator and afford a distribution of airgap flux suitable for generation of output voltage closely approximating the desirable sinusoidal form.

The amount of excitation of the generator is determined primarily by the phase angle of the conduction periods of the tubes T1 and T2. Assume, for example, that the conduction period for these tubes is started at a point leading the output voltage of the generator by exactly 90°, it can be appreciated from the foregoing explanation and diagrams such as Fig. 2H that there would be no net transfer of power to the direct current circuit and hence no excitation of the generator. If the conduction periods of the tubes T1 and T2 are started at a slightly smaller leading phase angle of say 88°, a substantial part of the volt-amperes output of the generator, or about 3½ per cent, would be made available to supply the losses in the direct current circuit and provide conduction current through the transformer windings P1 and P2. Since the inductor L and transformer windings P1 and P2 will have a relatively low effective resistance, and the tubes T1 and T2 operate with low losses at a high plate efficiency, as previously explained, a small percentage of the generator output will serve to provide a relatively large current in the direct current circuit, which may be commutated by the tubes T1 and T2 to give a substantial component of leading current for excitation of the generator. If the existing leading phase angle for starting conduction through the tubes T1 and T2 is decreased, i. e. if the conduction periods through these tubes are retarded, there is an increase in the net power transferred from the output circuit of the generator to the direct current circuit including the inductor L, and a corresponding increase in the amplitude of the blocks of current supplied to the output circuit to the generator for its excitation. Conversely, if the existing leading phase angle for starting conduction through the tubes T1 and T2 is increased, i. e. if their conduction periods are advanced, there is a decrease in the net power transferred and a decrease in the amplitude of the blocks of current conducted by the tubes and excitation of the generator.

Thus, by relatively small changes in the phase angle of the conduction periods for the power tubes T1 and T2, the desired variation in the excitation of the induction generator may be obtained. In this connection, it can be appreciated that the component of leading current for excitation purposes is provided by an uninterrupted series of blocks of current conducted through one tube or the other, as indicated in Fig. 2J, so that a small change in the amplitude or average value of these blocks of current represents a corresponding change in the effective value of the component of leading current, as distinctive from large variations in the amount of current conducted through tubes for short conduction periods, which is characteristic of the usual type of circuit employing hard vacuum tubes for control of currents. This means that the cathode to anode voltage is not materially varied for different degrees of excitation, and the tube losses and efficiency is nearly constant for a wide range of excitation.

*Automatic voltage regulation.*—Considering now the operaion of the grid control means and the features of automatic voltage regulation for the arrangement illustrated in Fig. 1, the voltage applied to the primary of the grid transformer GT is the voltage drop across the resistor 16, which has a phase relation to the output voltage of the generator corresponding with the phase relation of the current through this resistor 16 to such output voltage. The circuit through this resistor 16 may be traced from one side of the output circuit of the generator through the capacitor 15, resistor 16, slider 18, through the left-hand portion of the resistor 17 in the secondary circuit of the current transformer IT to the other side of the output circuit. This circuit includes the output voltage of the generator and the voltage drop in the selected portion of the resistor 17 in the secondary circuit of the transformer IT. Assuming some given amount of load current in phase with the generated voltage, and certain values of the inductance 19 and resistor 17 in the secondary circuit of the current transformer, the voltage ER across this resistor will have some predetermined phase relation with respect to the voltage EGN of the generator, such as indicated in the vector diagram of Fig. 3A. These voltages ER and EGN combine to give a voltage EPS in the circuit through the resistor 16 across the primary of the grid transformer GT; and the capacitor 15 is selected or adjusted with respect to the values of the resistance of the resistors 16, 17 in this circuit such that the current in this circuit and the voltage drop EG across the resistor 16 applied to the primary of the grid transformer GT leads the generator voltage EGN by a phase angle indicated as *a* in Fig. 3A, which is suitable for providing the excitation required for the given in-phase load current assumed.

Considering now the effect of variations in the load current without change in power factor, if the load current increases from the given value assumed and for which the phase angle for the conduction periods of the tubes T1 and T2 is the angle *a* indicated in Fig. 3A, such increase in the load current through the primary of the current transformer IT increases its secondary current and the voltage drop ER across the resistor 17, with only a slight change in the phase relation of this voltage drop. Referring to Fig. 3B, such increase in the voltage ER causes a small shift in the phase relation of the voltage EPS, which has the effect of reducing the leading phase angle of the conduction periods for the tubes T1 and T2 to an angle indicated in Fig. 3B as *a−b*. This corresponds to delaying or retarding the conduction periods through the tubes T1 and T2 slightly; and referring to Figs. 2G and 2H, it can be seen that such retardation of the conduction periods of the tubes T1 and T2 has the effect of increasing the area representing transfer of power to the direct current circuit, thereby providing a larger amount of net power to give a greater amplitude of the blocks of current conducted by the tubes T1 and T2 through the primary windings P1 and P2. Such increase in the direct current circulating through the inductor L and the transformer windings P1 and P2, without much change in the phase of this current, has the effect of increasing the component of leading magnetizing current supplied to the stator windings of the induction generator, so that its excitation is automatically increased to compensate for the increase in the load current at the unity power factor. Similarly, a decrease in the in-phase load from a given value assumed for the vector diagram of Fig. 3A is accompanied by a reduction in the voltage ER, which increases the leading phase angle $a$ and advances the conduction periods of the tubes T1 and T2 to reduce the excitation of the generator.

Thus, by appropriate selection of the values of the circuit elements involved in this phase shifting operation, the phase of the conduction periods of the tubes T1 and T2 may be accurately adjusted by changes in the magnitude of the in-phase load current to the appropriate extent to compensate for the variations in the reactance drop in the windings of the generator and the demagnetizing effect of such changes in load current.

Considering now how the excitation of the generator is varied with changes in the power factor of the load current, assume that the given in-phase load current assumed for the vector diagram of Fig. 3A becomes a lagging current with respect to the output voltage of the generator. This lag of the load current in the primary of the current transformer IT causes the voltage drop ER across the resistor 17 in the secondary circuit of this transformer to become more lagging, as indicated in the vector diagram of Fig. 3C. This in turn causes the voltage EPS to lag and reduce the leading phase angle of the conduction periods of the tubes T1 and T2 to some smaller angle, such as indicated as $a—c$ in Fig. 3C. This corresponds to a retardation of the conduction periods of the tubes T1 and T2, and an increase in the component of the leading current for excitation of the generator to compensate for the demagnetizing effect of the lagging component of the load current. If the given in-phase load current assumed for the vector diagram in Fig. 3A should become a leading current, a shift in phase occurs just the opposite to that described, as indicated in the vector diagram of Fig. 3D; and the leading phase angle $a$ as indicated in the Fig. 3A for the conduction periods of the tubes T1 and T2 is increased to an angle such as indicated as $a+d$ in Fig. 3D, corresponding to advancing the conduction periods of the tubes and reducing the excitation of the generator.

From this general explanation of the manner in which the various circuit elements involved determine the phase angle of the conduction periods of the tubes T1 and T2, it can be seen that suitable values of resistance, capacity and inductance may be selected or adjusted to cause the excitation current for the generator to be varied to the desired degree to compensate for changes in the output generated voltage that would otherwise result from a change in the magnitude or the power factor of the load current, thereby providing a constant output voltage under varying load conditions, or obtaining such regulation of voltage as may be considered expedient. It can be appreciated that this voltage regulation is accomplished by the operation of electron discharge tubes and is extremely quick in its action.

*Polyphase induction generators.*—The same general functions and mode of operation described with respect to a single phase induction generator may be readily applied to a polyphase generator, in the manner illustrated in Fig. 4. This adaptation or modification of the invention involves primarily a duplication of power tubes, control tubes, and other parts of the single phase organization. In the particular three-phase arrangement diagrammatically shown in Fig. 4, it is assumed that the generator will have three star-connected stator windings W1, W2 and W3 of the usual distributed type. Three starting capacitors C1, C2 and C3 are connected across these generator windings through back contacts 40 of the cutout relay CO. The three power tubes T1, T2 and T3 have their anodes connected to the output terminals of the generator windings W1, W2 and W3, and their cathodes are connected in series with an inductor L and the relay CO to the neutral of these generator windings. The three control tubes VT1, VT2 and VT3 are arranged in substantially the same manner as in Fig. 1 to control the grid potentials of the power tubes T1, T2 and T3. A similar source of current as a battery 41 and associated resistor 42 provides the anode voltage for the control tubes VT1, VT2 and VT3 and a positive potential for the grids of the power tubes T1, T2 and T3, substantially the same as in Fig. 1. The anode circuit in each of the control tubes VT1, VT2 and VT3 includes a load resistor $34^1$, $34^2$, $34^3$, so that when each of these tubes is rendered conductive in turn, the voltage drop through its load resistor applies a negative potential beyond cutoff to the grid of the associated power tube T1, T2 and T3, in the same manner and for the same purpose previously discussed in connection with Fig. 1.

In the three-phase organization of Fig. 4, the grid transformer GT has star or Y-connected secondary windings, having their terminals connected to the grids of the control tubes VT1, VT2 and VT3 in series with grid resistors 35. Since the power tubes T1, T2 and T3 in this three-phase organization of Fig. 4 should be conductive for approximately 120°, rather than the 180° of the single phase arrangement of Fig. 1, a suitable source of voltage, indicated as a battery 46, is provided in the connection between the neutral of the secondaries of the grid transformer GT and the cathodes of the control tubes VT1, VT2 and VT3. Referring to the explanatory curves of Fig. 5B, the axis of the grid voltages from the secondaries of the grid transformer GT is displaced with respect to the cathodes of the tubes VT1, VT2 and VT3 by the voltage of the battery 46, indicated as E46. With such displacement of the axis of the grid controlling voltages from the secondaries of the grid transformer GT, the grid potential for each of the control tubes VT1 and VT2 in turn is more negative than cutoff for slightly more than 120°. Considering the tube VT1, for example, if the axis of its grid control voltage from the secondary of the grid transformer GT is more positive than the cathode of this tube by the voltage E46, the negative half-cycles of this voltage as indicated in Fig. 5B will have negative values beyond the cutoff for this tube between the points indicated at 48 and 49. When this voltage makes the grid of the tube VT1 positive, and grid current flows, the grid resistor $35^1$ limits the potential of the grid to an approximately uniform positive value, such as indicated at 50 in Fig. 5B.

While the control tube VT1 is non-conductive between the points indicated at 48, 49 in Fig. 5B, there is no current or voltage drop in its load resistor 34[1]; and the potential on the grid of the associated power tube T1 is the normal positive potential provided by the voltage drop in the resistor 42 associated with the battery 41. Thus, the power tube T1 is fully conductive during the interval between the points indicated at 48, 49 in Fig. 5B of slightly more than 120°, while its control tube VT1 is cutoff and non-conductive. The other control tubes VT2 and VT3 act in a similar manner to render their associated power tubes T2 and T3 conductive for other intervals of slightly more than 120°.

As previously noted, it is considered preferable to maintain conduction through each of the power tubes T1, T2 and T3 until conduction has been started through the next tube, and also that these power tubes should be quickly changed from a condition of non-conduction to full conduction, and vice versa. These desired conditions may be obtained by appropriate selection of the amplitude of the grid controlling voltages from the grid transformer GT and the voltage of the battery 46, or equivalent means employed to displace the axis of these grid control voltages. It should be understood, however, that this particular control of the power tubes T1, T2 and T3 is considered desirable and preferable for the reasons previously mentioned, but is not essential in practicing the invention under all conditions.

In the three-phase organization shown in Fig. 4, current transformers IT1, IT2 and IT3, having resistors 51 and inductances 52 in their secondary circuits, are associated with the output circuits of the generator to provide automatic voltage regulation in the same manner and for the same purpose as in the single phase arrangement of Fig. 1 previously explained. In the three-phase organization as shown in Fig. 4, a different type of phase setting means is employed. The primaries of the grid transformer GT, shown delta-connected, are connected to the delta-connected windings 53 of one element of a phase shifting device PS of a well known type, commonly known as a synchro. Such a synchro phase shifting device comprises the usual three-phase windings on relatively movable stator and rotor elements, which may be positioned and held in such relative positions as necessary to give the desired phase relation between the voltages in the corresponding windings of these elements. As shown in Fig. 4, the Y-connected windings 54 on the other element of the phase shifting device PS have their terminals respectively connected to a slider on the resistor 51 in the secondary circuit of the associated current transformer IT1, IT2 or IT3, and the neutral of these windings 54 is connected by a wire 55 to the neutral of the generator windings W1, W2 and W3, as can be readily seen in the drawings. Thus, the circuit through each of the windings 54 of the phase shifting device PS includes the output voltage of an associated generator winding W1, W2 or W3 and the voltage drop in the resistor 51 of the associated current transformer IT1, IT2 or IT3, for the same purpose and for the same general effect as in the organization shown in Fig. 1 and previously explained.

The general mode of operation of the three-phase organization shown in Fig. 4 is substantially the same as that previously discussed for the single phase organization of Fig. 1, with the exception that the conduction periods for the power tubes T1, T2 and T3 are slightly more than 120°, rather than 180°. The circuit organization for governing the grids of the control tubes VT1, VT2 and VT3 acts in substantially the same way, as previously explained in connection with the vector diagrams of Figs. 3A to 3D for the single phase arrangement of Fig. 1, to provide automatic adjustment of the phase angle of the conduction periods for the power tubes T1, T2 and T3 to vary the excitation of the generator as required to compensate for changes in magnitude or power factor of the load. It is believed that this operation of automatic voltage regulation for the three-phase arrangement of Fig. 4 will be apparent from the foregoing discussion of this feature for the single phase arrangement of Fig. 1. In fact, the three-phase organization of Fig. 4 is fundamentally an extension to three phases of the same structural features and operating characteristics of the single phase arrangement of Fig. 1; and further detailed explanation of its features of operation, attributes and advantages appears to be unnecessary.

Figure 6:
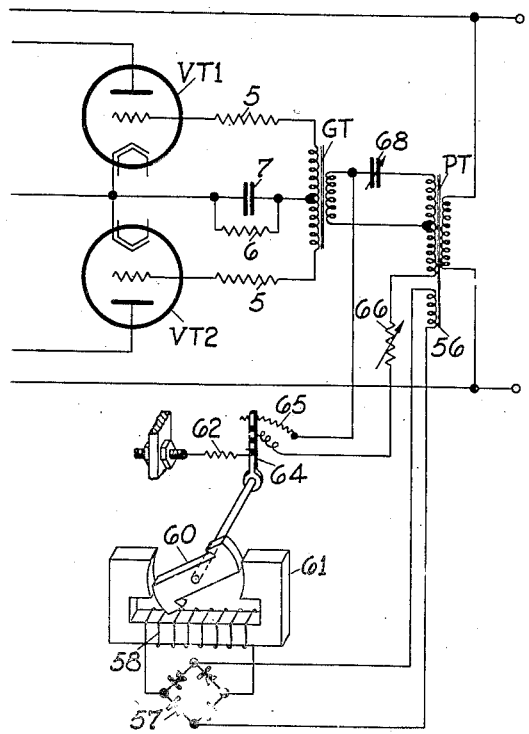
Figs. 6 and 7 illustrate modified forms of apparatus for providing automatic voltage regulation.

*Modifications for automatic voltage regulation.*—The arrangement shown in Fig. 1 for setting and automatically shifting the phase of the conduction periods of the power tubes T1 and T2 involves circuit elements with capacitance and inductance which change their values somewhat with frequency; and for some applications of the invention it may be expedient to employ a voltage regulating arrangement where changes in frequency do not affect the voltage regulation, since a change in frequency requires a change in excitation to hold voltage constant. Fig. 6 illustrates diagrammatically one arrangement for this purpose, using a torque motor responsive to the output voltage of the generator as a reference or standard for automatically shifting the phase of the grid control voltages in accordance with variations in the output voltage substantially independent of variations in frequency.

In the modified automatic voltage regulating organization shown in Fig. 6, the primary of a potential transformer PT is directly connected to the output circuit of the generator, and a center-tapped secondary of this transformer PT is connected by a phase shifting bridge to the primary of the grid transformer GT. Another secondary 56 of the potential transformer PT is connected through a conventional full-wave rectifier 57, such as the copper oxide or selenium type, to the winding 58 of a torque motor, which is illustrated schematically and comprises a pivoted Z-type armature 60 disposed in the airgap of a core 61 of general U-shape. This armature 60 is biased against the turning torque provided by the current in the winding 58 by a spring 62, which is preferably adjustable to conform with the output voltage desired. The movement of the armature 60 varies a resistance associated with the phase shifting bridge in any suitable manner. As shown diagrammatically, a contacting arm 64 attached to the armature 60 co-operates with a resistor 65 to vary its resistance to the appropriate extent as the position of the armature 60 and this contacting arm 64 is slightly shifted by variations in the output voltage and current supplied to the torque motor. The resistance 65 governed by the torque motor, together with an additional resistor 66 if desired, cooperates with a capacitor 68 in the phase shifting bridge in the usual and well known manner to provide the desired leading phase angle of the voltage to the grid transformer GT in the order of 88°.

Briefly outlining the mode of operation of this voltage regulating organization of Fig. 6, assume that the position of the armature 60 of the torque motor as shown corresponds with a voltage to the grid transformer GT which provides the appropriate leading phase angle for a given load current. If a change in this given load current should occur, either in magnitude or in power factor, which tends to reduce the existing output voltage of the generator, the reduced current in the winding 58 of the torque motor and the reduced pull on the armature 60 allows the spring 62 to move the contacting arm 64 to the left and increase the resistance of the resistor 65. This causes the phase shifting bridge to provide a less leading voltage for the grid transformer GT, which corresponds to a retardation in the conduction period of the power tubes T1 and T2, and causes an increased excitation of the generator to compensate for such change in load. Conversely, the excitation of the generator is automatically reduced in a similar manner when a change in load causes an increase in the output voltage.

In this arrangement of Fig. 6, even though changes in frequency may affect the phase angle setting of the phase shifting bridge, the action of the torque motor is dependent upon variations in the output voltage with respect to a fixed reference or standard corresponding with the tension of the spring 62, and hence makes such adjustment of phase as may be required to provide a substantially constant output voltage, independently of any phase shifting due to changes in frequency. It is contemplated that various well known structural and functional expedients, in the way of anti-hunting devices and the like, will be incorporated in the voltage regulating apparatus schematically illustrated in Fig. 6, in accordance with recognized practice.

Figure 7:
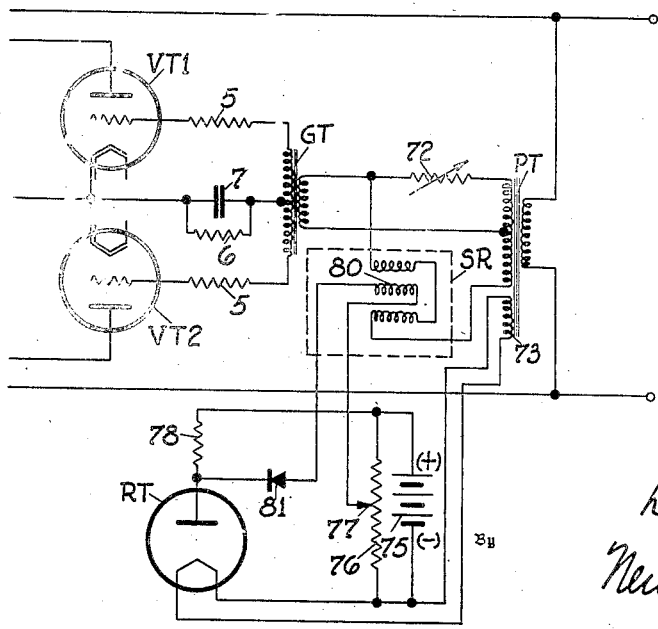

Another type of automatic voltage operating apparatus is illustrated schematically in Fig. 7, in which variations in the temperature and electron emission from the cathode of a regulator tube is utilized to control the inductance of a saturable reactor in a phase shifting bridge to obtain the desired phase adjustment for voltage regulation. In the arrangement as shown in Fig. 7, a potential transformer PT has its primary directly connected across the output circuit of the generator; and a center-tapped secondary of this transformer PT is connected to a phase shifting bridge, including an adjustable resistor 72 and a saturable reactor SR, supplying voltage to the primary of the grid transformer GT, in a manner that can be readily understood from the drawings. Another secondary 73 of the potential transformer PT supplies heating current to the cathode of a regulator tube RT. A suitable source of direct current, illustrated as a battery 75 supplies current to a potentiometer resistor 76, having a slider 77, and to the anode of the regulator tube RT through a load resistor 78. The saturating coil 80 of the saturable reactor SR is connected in series with a blocking rectifier 81 of a suitable type, such as copper oxide or selenium, across the anode of the regulator tube RT and a point on the potentiometer resistor 76 determined by the slider 77. The regulator tube RT is assumed to be a hard vacuum diode, preferably with a tungsten filament, and the fixed anode voltage provided by the battery 75 is such that the plate current of this tube is determined primarily by the temperature and electron emission of its cathode.

Briefly outlining the mode of operation of this voltage regulating organization of Fig. 7, the values of the resistor 72 and the inductance of the saturable reactor, with no current in its saturating coil 80, are selected or adjusted to provide the smallest leading phase angle for the grid control voltages and maximum excitation. Assuming that the generator is being started up, and its output voltage is zero, there is no heating of the cathode of the regulator tube RT, and the end of the circuit for the saturable coil 80 of the saturable reactor connected to the anode of this regulator tube is at potential of the positive terminal of the battery 75. The other end of this same circuit for the saturating coil 80 connected to the slider 77 is at a negative potential corresponding to the drop through the upper portion of the resistor 76; but the rectifier 81 blocks the flow of current through this saturating coil in this direction. As the output voltage of the generator builds up, and the cathode of the regulator tube RT is heated, electron emission from this cathode allows current to flow through the load resistor 78, making the potential of the corresponding end of the circuit through the saturating coil of the saturable reactor more negative. When the voltage drop in the load resistor 78 exceeds the voltage drop in the upper portion of the potentiometer resistor 76, current may flow through the saturating coil 80 of the saturable reactor, thereby reducing its inductance and increasing the leading phase angle of the grid control voltages, which has the effect of cutting down the excitation of the generator, as previously explained. When the output voltage of the generator and the temperature of the cathode of the regulator tube RT has the desired value for which the parts are selected or adjusted, the current through the saturating coil 80 of the saturable reactor is such that the leading phase angle of the grid control voltages corresponds with the excitation of the generator required. It is contemplated that the amount of current in the saturating coil 80 of the saturable reactor for no load conditions will be large enough, so that a removal of such saturating current will provide enough increased excitation for the extreme load conditions contemplated.

Assume now that there is some change in the magnitude or power factor of the load under given existing conditions which tends to reduce the output voltage of the generator. Such reduction in output voltage reduces the heating current being supplied to the cathode of the regulator tube RT, thereby lowering its temperature and emission. The resultant reduction in anode current through the load resistor 78 of this regulator tube RT makes the potential of its anode less negative with respect to the slider 77 on the resistor 76, thereby reducing the current through the saturating winding 80 of the saturable reactor SR. This increases the inductance provided by the saturable reactor in the phase shifting bridge to have the effect of retarding the phase of the grid control voltages supplied to the grid transformer GT and the grids of the control tubes VT1 and VT2, so as to retard the conduction periods of the power tubes T1 and T2 to increase the excitation current. On the other hand, if a change in existing load conditions should occur which tends to increase the output voltage, the temperature of the cathode of the regulator tube RT is raised, and its emission increased to allow more current to flow through its load resistor 78. This makes the potential of the anode of the tube RT more negative with respect to the slider 77 for the resistor 76, and causes more current to be supplied to the saturating winding 80 of the saturable reactor, thereby lowering its inductance and advancing the conduction periods of the power tubes T1 and T2 to reduce the excitation of the generator.

Thus, the excitation of the generator is automatically regulated to compensate for variations in its output voltage due to changes either in the magnitude or power factor of the load, so as to provide such constant or other voltage regulation for which the phase shifting control means is designed, within the limits of its sensitivity and accuracy. Various other aspects of this modified form of voltage regulating means shown in Fig. 7 will be apparent without detailed explanation.

*Direct current output modification.*—Under some conditions it may be expedient to rectify the alternating current output of the induction generator to supply a uni-directional or direct current to some load circuit, as for example, in connection with electrolytic processes, welding operations, and the like. Under some conditions, it may be desirable to govern the excitation of the generator to give an essentially constant direct current voltage independent of the speed and frequency of the generator.

Fig. 8 illustrates diagrammatically an organization for this purpose, which as shown employs the same circuit organization of Fig. 1 for the power tubes T1 and T2 and the control of their grids by the control tubes VT1 and VT2. In this modification of Fig. 8, the output circuit of the induction generator is connected to the terminals 84 of a direct current circuit through a full-wave rectifier of any suitable type, illustrated as a bridge arrangement using gas filled diodes 85, preferably with a smoothing inductance or filter as indicated at 86.

The phase of the grid control voltages supplied to the grid transformer GT is automatically adjusted by a torque motor to give a constant voltage for the direct current circuit, rather than a constant alternating current output voltage from the generator. In the arrangement shown in Fig. 8, the primary of the grid transformer GT is connected to the winding 89 of a movable rotor element of a typical synchro device PS, which has the windings 90, 91 on its stator element respectively connected through an adjustable capacitor 92 and adjustable resistor 93 to the terminals of a center tapped secondary of a transformer PT, as will be readily apparent from the drawings. The primary of transformer PT is connected across the output circuit of the generator. Thus, the current in one winding 90 of the stator of this synchro device PS leads the current in the other winding 91 by approximately 90°, and the position of the winding 89 on the rotor relative to these two windings 90, 91 of the stator determines the phase relation of the voltage in the rotor winding 89 with respect to the output voltage of the generator. A torque motor, similar to that shown in Fig. 6 and previously described, has its armature 96 connected to the rotor of the phase shifting synchro device PS, as indicated by a dash line; and a pull on this armature 96 by energization of the winding 97 is opposed by an adjustable spring 98. The winding 97 of this torque motor is connected to the direct current circuit.

Assuming some given load conditions for the direct current circuit and some speed and frequency for the generator, the torque motor is establishing a phase angle of the grid control voltages which gives an excitation current for the generator suitable to provide a voltage of the generator at the existing frequency, which when rectified will represent the average direct current voltage desired, and for which the spring 98 of the torque motor is adjusted. If a change should occur in the load on the direct current circuit under such given conditions, which tends to reduce the direct current voltage, the tension of the spring 98 exceeds the pull on the armature 96 of the torque motor, and moves the rotor of the synchro phase shifting device PS in one direction, counterclockwise as shown, which reduces the leading phase angle of the grid control voltages to retard the conduction periods of the power tubes T1 and T2 and increase the excitation of the generator, thereby providing an increased output voltage to give a larger rectified current to supply the increased load. Similarly, if a change in the direct current load should occur which tends to increase the output direct current voltage, the increased excitation of the winding 97 of the torque motor moves its armature 96 clockwise to turn the rotor of the synchro device PS, and increase the leading phase angle of the grid control voltages and reduce the excitation of the generator.

With this brief explanation, it can be understood how the controllable excitation functions characteristic of this invention may be utilized in situations such as assumed, where it is expedient to rectify the alternating current output of the generator and govern its excitation to maintain a substantially constant voltage for the direct current load circuit. It is contemplated that the torque motor will have sufficient inherent inertia, or be equipped with auxiliary damping means, to a degree that it will not respond to the periodic ripple variations in the rectified direct current voltage, but only to changes in the average value of such voltage.

*Permanent magnet generators.*—The excitation apparatus of this invention may be advantageously employed in connection with alternating current generators of the permanent magnet type, in which a permanent magnet rotor is used instead of field coils to provide the main airgap flux for inducing voltages in the armature or stator windings as this rotor is revolved. A permanent magnet type of rotor has no coils to be held in place against centrifugal forces, involves no coil slots, and may be accurately finished and balanced to have low windage losses and vibrations at the high rotational speeds desirable for certain types of prime movers, such as steam or gas turbines. In spite of its structural advantages, however, the permanent magnet type of alternating current generator has had a very restricted use, primarily because of its poor voltage regulation. In the ordinary synchronous generator, the current through the field coils may be varied to change the magneto-motive-force of the main field and compensate for the effective armature reaction and the like tending to reduce the output voltage upon increases in the load; but the M. M. F. of a permanent magnet type of rotor is fixed, and voltage regulation cannot be obtained by varying the strength of the main field. The excitation apparatus of this invention, however, may be employed to provide the desired voltage regulation for a permanent magnet type of generator, and also a certain amount of self-excitation. The operation of the invention in this respect depends upon what is commonly known as armature reaction in alternating current generators.

For the purpose of discussion, it may be considered that the effect of armature current upon the main field and airgap flux is the same in a permanent magnet generator as in the usual synchronous generator using excited field coils to provide the main field, rather than a permanent magnet. It is well known that armature reaction in a synchronous generator has the effect of weakening or strengthening the main field and the generated voltage dependent upon the power factor of the load current. When the load current is lagging, armature reaction tends to weaken the main field and reduce the generated voltage; whereas if the load current is leading, the armature reaction has the opposite effect of strengthening the main field and increasing the generated voltage. This may be considered to be due to the fact that the current in the armature coils is alternating and creates magneto-motive-forces which vary during the time the flux provided by the magneto-motive-force of the main field is moving relative to these coils to generate therein the output voltage of the machine. If the alternating current in the armature coils is in phase with the voltage being generated, the variations in the M. M. F. created by this current occur in general at times to react with the M. M. F. of the field to give a cross-magnetizing effect and field distortion; but if the armature current is out of phase with the generated voltage, the variations in the resultant M. M. F. due to this current in the armature coils occurs at times to react with the M. M. F. of the field to give a net weakening or strengthening of the airgap flux and generated voltage, dependent upon whether the armature current lags or leads the generated voltage. The amount of weakening or strengthening of the main field and the generated voltage increases with the phase angle of the lagging or leading armature current.

While there are other factors involved in a complete analysis of the voltage characteristics of an alternating current generator, such as armature resistance and reactance, it can be seen from these general statements about the nature of armature reaction that, if the current flowing in the armature or stator windings could be made to flow in the proper phase relation to the generated voltage as required from time to time for existing load conditions, the desired output could be obtained without the change in voltage that would otherwise be caused by armature reaction. It can be appreciated from the previous explanation of the functions and mode of operation of the excitation apparatus of this invention, such as shown for example in Fig. 1 for an induction generator, that the organization of this invention enables any desired component of leading current to be supplied to the armature or stator windings from the output of the generator. This component of leading current may be such as to compensate for the lagging component of the existing load current that would otherwise have the effect of weakening the main field by armature reaction and reduce the generated voltage. Also, this component of leading current may be made sufficiently larger than required by the power factor of the existing load to strengthen the main field and give a higher generated voltage to compensate for the voltage drop of the load current through the armature resistance and reactance. Further, this leading component of current in the armature windings may be made large enough that the armature reaction of such a current will give resultant magneto-motive-forces tending to strengthen the airgap flux that would otherwise be supplied by the magneto-motive-force of the permanent magnet rotor.

In view of this explanation, it can be readily understood how the excitation apparatus of this invention may be advantageously employed with alternating current generators of the permanent magnet type to obtain regulation of the output voltage that has heretofore limited the use of such generators, and also provide a form of self-excitation to enable higher generated voltages to be obtained for the same strength of permanent magnet used for the rotor.

Fig. 9 illustrates schematically an alternating current generator of the permanent magnet type equipped with the excitation apparatus in the particular form shown in Fig. 1, although it should be understood that various other types of excitation apparatus heretofore described could likewise be employed. It is assumed that the rotor R shown in Fig. 9 is a solid structure including a body of suitable permanent magnet steel or alloy, such as Alnico, which is magnetized in accordance with the usual practice to form a plurality of magnetic poles indicated as N and S. The detailed structure of this rotor is not material to the invention; but it is assumed that it will be designed in accordance with recognized practice so that it may be operated at high rotational speeds with low windage losses and vibration. This permanent magnet rotor R cooperates with a suitable stator winding of the usual distributed type indicated diagrammatically as coils W. Since armature reaction is not a factor in this generating equipment, small operating airgaps may be employed.

The organization of tubes and grid control means shown in Fig. 9 is the same as shown in Fig. 1 and previously explained, with connections to the output circuit of the permanent magnet generator the same as for the induction generator of Fig. 1. Other arrangements can of course be employed, including the three-phase arrangement shown in Fig. 4.

The general mode of operation for this modification of Fig. 9 will be apparent from the foregoing explanations and discussions. It is contemplated that the rotor R will have some convenient amount of magneto-motive-force. This M. M. F. of the rotor should be small enough that the desired output voltage will not be exceeded at maximum rotor speed and the largest amount of leading load current anticipated. However, with this invention, the permanent magnet of the rotor need not be strong enough to generate the desired output voltage for all load conditions, since the conduction period of the power tubes T1 and T2 may be regulated, as previously explained, to supply a large component of leading current to the windings W of the generator for its self-excitation, within the limits of the capacity of the tubes T1 and T2 and associated circuit elements to provide such current. For example, when the generator has developed a certain output on the basis of the airgap flux provided by the strength of the permanent magnet rotor, some of this output may be used to provide a component of leading current in the generator windings W, which will have the effect of armature reaction to strengthen the field provided by the rotor and generate a still higher voltage, assuming of course that the magnetic circuit is not saturated. This same action of self-excitation is employed to maintain the output voltage under heavy lagging load currents, and consequently such self-excitation cannot be carried beyond the point where the desired voltage regulation is obtained for the strength of permanent magnet rotor being used.

The action of the grid control means to shift the phase of the conduction periods of the power tubes T1 and T2 dependent upon variations in the load acts to provide automatic voltage regulation for the permanent magnet type of generator shown in Fig. 9 in substantially the same way as for the induction generator of Fig. 1, and previously explained in connection with the vector diagram in Figs. 3A and 3D. For example, the effect of retarding the conduction periods of power tubes T1 and T2 is to provide a larger component of leading current in the windings W of the generator, which gives an armature reaction effect tending to strengthen the main field and airgap flux to increase the generated voltage. Conversely, advancing the conduction periods of the tubes T1 and T2 reduces this component of leading current and reduces the generated voltage. In this connection, if conduction through the tubes T1 and T2 should be advanced to start at exactly 90° leading the voltage, there would be no component of leading current supplied to the generator windings W, and the output voltage would be that generated at the existing rotor speed by the airgap flux provided by the permanent magnet of the rotor alone.

The excitation apparatus of this invention may also be applied without departing from its principles and mode of operation to the control of the exciting current of the field coils of a conventional synchronous alternating current generator, with or without salient poles, for the purpose of voltage regulation, or may be employed to provide all of the exciting current for such a type generator. In the latter case, the residual flux is relied upon to build up a generated voltage sufficient for conduction through the power tubes T1 and T2, and then the full exciting current derived from the output voltage of the generator is supplied by tube currents in the same manner already described.

Any suitable type of the well known rectifier circuit organizations, either single phase or polyphase, may be employed for providing the appropriate interconnection between the inductor L as a direct current circuit and the windings to be excited as an alternating current circuit; and any suitable type of grid control means, including various forms of phase shifting devices, may be employed to render the power tubes T1 and T2 fully conductive, with an essentially uniform grid potential, for the desired conduction periods. In this connection the grid control means is preferably of the type affording what may be termed essentially flat topped or square wave grid excitation, in the interests of operating the power tubes at a high plate efficiency; and while this is the preferable arrangement, and also tubes of the magnatriode type are preferably employed, other arrangements of grid control and types of tubes may be utilized to advantage in accordance with this invention without departing from the nature and scope of the invention.

Certain specific embodiments of the invention have been illustrated and described with a view of making clear the underlying functions, attributes, and characteristic features of the combination of electron discharge tubes and circuit elements embodying the invention; but it should be understood that various adaptations, modifications, and additions may be made in the specific embodiments of the invention shown and described, without departing from the invention.

What I claim is:

1. Excitation apparatus of the character described for alternating current generators comprising in combination, an output circuit for the generator, a relatively large inductance, a circuit organization including a plurality of high vacuum electron discharge tubes each having a control element capable of stopping as well as starting conduction through the tube, said circuit organization connecting said inductance with the output circuit of the generator only by conduction through said tubes, means applying control voltages to the control elements of said tubes to initiate their conduction periods at a controllable leading phase angle with respect to the voltage in the output circuit of said generator, said circuit organization acting as a rectifier during one part of the conduction periods of said tubes to supply uni-directional current from the output circuit to said inductance, said circuit organization acting as an inverter during another part of the conduction periods of said tubes to supply an alternating current from said inductance to said output circuit leading the voltage in the output circuit, and means for automatically controlling the leading phase angle of the conduction periods of said tubes with respect to the voltage in the output circuit and thereby vary the component of leading current provided in the output circuit for self-excitation of the generator.

2. Excitation apparatus of the character described for alternating current generators comprising in combination, an output circuit of the generator connected to its stator winding, a direct current circuit including a relatively large inductance, means including a plurality of hard vacuum electron discharge tubes with control elements and interconnecting said output circuit and said direct current circuit for transfer of energy to and from said direct current circuit and its inductance, and means for governing the control elements of said tube to render each tube conductive in turn for a prolonged period approximately until conduction through another tube is started, said means acting to initiate conduction through each tube at a leading phase angle with respect to the voltage in said output circuit to provide conduction through the tube while the voltage in said output circuit is supplying positive potential to the anode of said tube for a time slightly longer than when said voltage is negative, whereby a component of leading current is provided in said output circuit for self-excitation of the generator.

3. Excitation apparatus of the character described for alternating current generators providing generated voltages dependent upon the leading component of current in its output circuit, comprising in combination with said output circuit, a direct current circuit including an inductor of relatively large inductance, a plurality of electron discharge tubes each having a control element capable of stopping as well as starting conduction through the tube for positive anode potentials, circuit elements interconnecting the anode circuits of said tubes with the output circuit of the generator and said direct current circuit to enable the output circuit of the generator to supply uni-directional current to said direct current circuit and its inductor during a portion of the conduction periods of said tubes and a leading component of alternating current to said output circuit during another part of the conduction periods of said tubes, and means for rendering said tubes conductive in turn for prolonged periods approximately until conduction through another tube is started, said means initiating conduction through said tubes in a predetermined leading phase relation to the voltage in said output circuit, whereby said generator is self-excited from its output circuit.

4. Excitation apparatus of the character described for alternating current generators providing a generated voltage in an output circuit dependent upon the component of leading current in said output circuit, comprising in combination with said output circuit, a direct current circuit including a relatively large inductance, means including circuit elements and a plurality of controllable hard vacuum electron discharge tubes connecting said direct current circuit to the output circuit of the generator only by conduction through said tubes, each of said tubes having a control element capable of stopping as well as starting conduction through the tube, said means acting when the conduction periods of said tubes occur at a leading phase angle with respect to the voltage in the output circuit of the generator to transfer energy from said output circuit to said direct current circuit and its inductance and return to the output circuit a component of leading current for excitation of the generator, and means for supplying control voltages to the control elements of said tube and operable to control the phase angle of the conduction periods of said tubes to vary the component of leading current for excitation of the generator.

5. Excitation apparatus of the character described for alternating current generators of the type providing a generated voltage in an output circuit dependent upon the component of leading current in said output circuit, comprising in combination, a direct current circuit including a relatively large inductance, means including a plurality of electron tubes transferring energy from the output circuit of the generator to said direct current circuit and its inductance and returning to said output circuit a component of leading current, each of said tubes having a control element capable of stopping as well as starting conduction through the tube, and grid control means for governing the control elements of said tubes to render each tube conductive in turn for approximately 180° of the voltage in said output circuit, said grid control means acting to initiate conduction through each tube at a leading phase angle of somewhat less than 90° with respect to said output voltage.

6. Excitation apparatus of the character described for alternating current generators comprising in combination, an output circuit for the generator connected to its stator windings, means including a relatively large inductance and a plurality of grid controlled hard vacuum power tubes for receiving energy from said output circuit and returning thereto a component of leading current, grid control means providing essentially flat-topped grid control voltage waves for rendering said tubes fully conductive and nonconductive in turn, said grid control means rendering each tube conductive for a prolonged period approximately until conduction through another tube is started, and means controlled by the voltage in said output circuit for governing said grid control means to provide conduction periods for said tubes having a predetermined and controllable phase relation to said voltage in the output circuit.

7. Excitation apparatus of the character described for alternating current generators of the type providing a generated output voltage dependent upon the component of leading current in the output circuit of the generator comprising in combination with said output circuit, a direct current circuit including a relatively large inductance, a plurality of electron discharge tubes and circuit elements arranged in a rectifying circuit organization and interconnecting said direct current circuit and said output circuit of the generator, each of said tubes including a control element capable of stopping as well as starting conduction through the tube for positive anode voltages, grid control means for governing the control elements of said tubes to render them fully conductive in turn for a prolonged period approximately until conduction through another tube is started, and means including phase shifting circuit elements and energized by the voltage in said output circuit for governing said grid control means to initiate conduction through said tubes at a controllable leading phase angle of nearly 90° with respect to the output voltage, whereby energy is transferred from the output circuit to the direct current circuit and its inductance for a time somewhat longer than the time energy stored in said inductance is returned to said output circuit to constitute a component of leading current.

8. Excitation apparatus of the character described for alternating current generators comprising in combination, an output circuit for the generator connected to its stator windings, a direct current circuit including an inductance, means including circuit elements and a plurality of electron discharge tubes for storing energy in said inductance from said output circuit for a time during each of the successive cycles and returning current to said output circuit at other times during said successive cycles, said inductance being large enough to maintain a continuous current in the direct current circuit and through said inductance during the conduction periods of said tubes, and control means for rendering said tubes fully conductive in turn for a prolonged period approximately until conduction through another tube is started, said means acting to initiate conduction through the tubes at a leading phase angle of nearly 90° with respect to the voltage in the output circuit, whereby energy is supplied to said direct current circuit and its inductance from the output circuit of the generator and is returned to said output circuit to constitute a component of leading current for excitation of the generator.

9. Excitation apparatus of the character described for alternating current generators of the type providing a generated voltage dependent upon the component of leading current in the output circuit of the generator, said excitation apparatus comprising in combination with said output circuit, a direct current circuit including a relatively large inductance, a plurality of grid controlled hard vacuum power tubes, a circuit organization interconnecting the anode circuits of said tubes with said direct current circuit and said output circuit of the generator, said circuit organization enabling uni-directional current to be supplied to said direct current circuit and its inductance during part of the conduction periods of said tubes and blocks of current of opposite polarity to be supplied from the direct current circuit and its inductance to said output circuit during another part of the conduction periods of said tubes, grid control means controlled by the voltage in the output circuit of the generator for rendering said tubes conductive in turn for prolonged conduction periods approximately until conduction through another tube is started, and means including phase shifting circuit elements for governing said grid control means to start conduction through said tubes at a leading phase angle with respect to the output voltage of the generator in the order of 88°.

10. Excitation apparatus of the character described for alternating current generators comprising, in combination with the output circuit of the generator, an inductor having a relatively large inductance, means including circuit elements and a plurality of grid control hard vacuum power tubes for interconnecting said inductor with said output circuit of the generator, said means acting as a rectifier to store energy in said inductor during part of each of the successive cycles and as an inverter during other parts of the successive cycles to supply an uninterrupted series of blocks of current of alternate polarity to said output circuit of the generator, and grid control means energized by the voltage in said output circuit of the generator for rendering said tubes fully conductive for prolonged periods approximately until conduction through another tube is started, said grid control means initiating conduction through said tubes at the leading phase angle with respect to the voltage in the output circuit of the generator of nearly 90°.

11. Excitation apparatus of the character described for alternating current generators of the type providing a generated voltage dependent upon the leading component of current in the output circuit of the generator, said excitation apparatus comprising in combination with said output circuit, a direct current circuit including a relatively large inductance, means including circuit elements and a plurality of controllable hard vacuum power tubes for connecting said direct current circuit with the output circuit of the generator, said means acting to supply energy from said output circuit to said direct current circuit and its inductance by conduction through one tube during part of each of the successive half cycles of the output voltage of the generator and to return current from said direct current circuit and its inductance to said output circuit by conduction through another tube during the remainder of the successive half cycles, and control means for rendering said tubes conductive in turn for a prolonged period approximately until conduction through the next tube is started, said control means acting to start conduction through said tubes at a controllable leading phase angle somewhat less than 90°, whereby a component of leading current derived from the output circuit of the generator is supplied to said output circuit for self-excitation of the generator.

12. Automatic excitation apparatus for alternating current generators acting to provide a generated voltage dependent upon the component of leading current in the output circuit of the generator, comprising in combination with said output circuit of the generator, a direct current circuit including a relatively large inductance, a plurality of electron discharge tubes each having a control element capable of stopping as well as starting conduction through the tube for positive anode potentials, circuit elements interconnecting said tubes with said output circuit and said direct current circuit for transferring energy from said output circuit to said direct current circuit and its inductance and returning to said output circuit a component of leading current for excitation of the generator, said component of leading current varying with changes in the leading phase angle of the conduction periods of said tubes with respect to the voltage in said output circuit, and automatic means for governing the phase angle of the conduction periods of said tubes to vary the excitation of the generator to compensate for changes in the magnitude and power factor of its load current.

13. Excitation apparatus of the character described for alternating current generators providing generated voltages in an output circuit varying with the component of leading current in that circuit comprising in combination, a direct current circuit including a relatively large inductance, a circuit organization including a plurality of hard vacuum electron discharge tubes for transferring energy from the output circuit of the generator to said inductance and returning to said output circuit a component of leading current, said component of leading current varying with the leading phase angle of the conduction periods of said tubes with respect to the voltage in the output circuit of the generator, and means for automatically controlling the phase angle of the conduction periods of said tubes in accordance with changes in the magnitude and power factor of the load current to provide a varying excitation of the generator, and thereby give a predetermined regulation of the voltage in its output circuit under varying load conditions.

14. Excitation apparatus of the character described for alternating current generators of the type acting to generate a voltage for an output circuit dependent upon a component of leading current in said output circuit, said generating apparatus comprising in combination, a circuit organization including a plurality of controllable hard vacuum electron discharge tubes energized from the output circuit of the generator and acting as an inverter to provide a component of leading current in said output circuit, each of said tubes having a control element capable of stopping as well as starting conduction through the tube, grid control means for governing the control elements of said tubes to render them conductive in turn for prolonged periods approximately until conduction through another tube is started, and automatic voltage regulating means for governing said control means to provide conduction periods for said tubes having a leading phase relation to the voltage in the output circuit varying with the magnitude and power factor of the load current in said output circuit, whereby excitation of the generator is automatically controlled to give a predetermined regulation of output voltage under varying load conditions.

15. Excitation apparatus for alternating current generators comprising in combination, means including a relatively large inductance and a plurality of controllable electron discharge power tubes for receiving energy from the output circuit of the generator and returning thereto a component of leading current varying with the leading phase angle of the conduction periods of said tubes with respect to the voltage in said voltage output, each of said tubes including a control element capable of stopping as well as starting conduction through the tube; means including phase shifting circuit elements for governing the control elements of said tubes to render them fully conductive for a prolonged period approximately until conduction through another tube is started, said conduction periods of said tubes occurring in a leading phase relation to the voltage in the output voltage of the generator determined by the condition of said phase shifting elements, and means including a voltage reference standard for governing said phase shifting elements to regulate the phase angle of the conduction of said tubes independently of said variations in frequency to vary the excitation of the generator and maintain an essentially uniform voltage in said output circuit under varying load conditions.

16. Excitation apparatus of the character described providing automatic voltage regulation for alternating current generators of the type generating a voltage for an output circuit dependent upon the component of leading current in such circuit, comprising in combination with said output circuit, of means including a plurality of grid controlled hard vacuum electron discharge power tubes for receiving energy from said output circuit and returning thereto a component of leading current varying with the leading phase relation of the conduction periods of said tubes with respect to the voltage in the output circuit, and automatic means including a reference voltage element for governing the phase relation of the conductive periods of said tubes in accordance with the difference between the voltage in the output circuit and that established by said reference element, whereby self-excitation of the generator is automatically controlled to provide an essentially uniform output voltage under varying load conditions.

17. Excitation apparatus of the character described for automatic voltage regulation of alternating current generators of the type providing a generated voltage dependent upon the component of leading current in its output circuit, said excitation apparatus comprising in combination, means including a relatively large inductance and a plurality of grid controlled power tubes for receiving energy from the output circuit of the generator and returning thereto a component of leading current for the excitation of the generator, said means acting to vary the excitation of the generator and its generated voltage dependent upon the leading phase angle of the conduction periods of said tubes with respect to the output voltage of the generator, and grid control means for said tubes including a phase shifting network and a voltage reference element for automatically governing the phase angle of the conduction periods of said tubes in response to variations in the output voltage of the generator with respect to the standard fixed voltage determined by said reference element.

18. Excitation apparatus of the character described for alternating current generators comprising in combination, an output circuit for the generator, means including a relatively large inductance and a plurality of controllable electron discharge power tubes for receiving energy from the output circuit and returning thereto a component of leading current for excitation of the generator, means including a plurality of pilot tubes for rendering said power tubes alternately fully conductive and non-conductive in turn, and grid control means for said pilot tubes responsive to variations in the power factor of the load current in said output circuit for controlling the phase relation of the conduction periods of said power tubes with respect to voltage in said output circuit and thereby vary the excitation of the generator under varying load conditions.

19. Automatic excitation apparatus of the character described for alternating current generators comprising in combination, an output circuit for the generator, means including a plurality of grid controlled hard vacuum electron discharge tubes each having a control element capable of stopping as well as starting conduction through the tube, said means including a relatively large inductance and circuit elements connecting said inductance to the output circuit of the generator only by conduction through said tubes, said inductance receiving energy from said output circuit and returning thereto a component of leading current varying with the phase relation of the conduction periods of said tubes with respect to the voltage in said output circuit, and automatic means responsive to changes in the power factor in the load current in said output circuit for controlling the conduction periods of said tubes and thereby provide the component of leading current for excitation of the generator as required to give a predetermined regulation of the voltage in said output circuit under varying load conditions.

20. Excitation apparatus for alternating current generators of the type generating an output voltage dependent on the component of leading current in the output circuit of the generator comprising in combination, an iron core inductor having a relatively large inductance, means including said inductor and a plurality of controllable electron discharge tubes for storing energy from the output circuit of said generator in said inductor and returning to the output circuit a component of leading current, each of said tubes having a control element capable of stopping as well as starting conduction through the tube for positive anode voltages, grid control means including phase shifting circuit elements and controlled from the voltage in the output circuit of the generator for governing the control elements of said tubes to determine their conduction periods, said phase shifting circuit elements normally acting to initiate conduction through said tubes in turn at a leading phase angle of nearly 90° with respect to the voltage in said output circuit, and means responsive to variations in load current for the generator for slightly varying said leading phase angle of the conduction periods of said tubes, and thereby vary the excitation of the generator dependent upon changes in load to obtain a predetermined regulation of the output voltage of the generator under varying load conditions.

21. Excitation apparatus of the character described for alternating current generators comprising in combination, an output circuit for the generator, means including a relatively large inductance and a plurality of grid controlled power tubes in a rectifying circuit organization for supplying energy to said inductance from said output circuit and returning thereto a component of leading current, grid control means including changeable phase shifting circuit elements and energized from the voltage in said output circuit of the generator for rendering said tubes fully conductive in turn for approximately a half cycle at a relatively large leading phase angle with respect to said voltage, and voltage regulating means for governing said phase shifting circuit elements of the grid control means to decrease the leading phase angle of the conduction periods through said tubes and thereby increase the excitation of the generator when the voltage in its output circuit is decreased by a change in its load.

22. Excitation apparatus for alternating current generators having a permanent magnet rotor cooperating with stator windings to generate a voltage in an output circuit connected to said stator windings, said excitation apparatus comprising in combination, means including a relatively large inductance and a plurality of controllable hard vacuum tubes each having a control element capable of stopping as well as starting conduction through the tube, said means including circuits connecting said inductance with said output circuit only during the conduction periods of said tubes, said inductance receiving energy from said output circuit and returning thereto a component of leading current varying with the leading phase angle of the conduction periods of said tubes with respect to the voltage in said output circuit, and means dependent upon the voltage of said output circuit for governing the phase angle of the conduction periods of said tubes to provide a component of leading current in the stator windings of the generator to maintain airgap flux and generated voltage in spite of variations in load current.

23. Excitation apparatus for alternating current generators of the permanent magnet type comprising in combination, an output circuit connected to the stator windings of the generator and having a generated voltage supplied thereto dependent upon a magneto-motive-force of the permanent magnet rotor and the component of leading current in said output circuit, means including a relatively large inductance and a plurality of controllable electron discharge power tubes for receiving energy from said output circuit of the generator and returning thereto a component of leading current varying with the leading phase relation of the conduction periods of said tubes with respect to the voltage in said output circuit, a plurality of pilot tubes for determining the conduction periods of said power tubes, and grid control means including phase shifting circuit elements for governing said pilot tubes to establish conduction periods for said power tubes conforming with the excitation of the generator required to maintain a substantially constant output voltage.

24. Excitation apparatus for alternating current generators of the induction type comprising in combination, an output circuit of the generator connected to its stator windings, a starting capacitor associated with said output circuit for providing leading current therein to permit the generator to build up a generated voltage when started, means including a relatively large inductance and a plurality of hard vacuum controllable electron discharge tubes each having a control element capable of stopping as well as starting conduction through the tube, said means including circuit elements connecting said inductance with said output circuit only during the conduction periods of said tubes, said means acting when the conduction periods of said tubes are initiated at a leading phase angle with respect to the voltage in said output circuit to transfer energy to said inductance to be returned to the output circuit as a component of leading current for excitation of the generator, means energized from said output circuit for governing the conduction periods of said tubes and providing a controllable component of leading current in said output circuit independently of said capacitor for excitation of the generator, and means responsive to current through said inductance for disconnecting said starting capacitor during starting of the generator after it has built up its generated voltage.

25. Excitation apparatus of the character described for alternating current generators of the induction type comprising in combination, a starting capacitor connected to the output circuit of the generator when at rest and enabling said generator to build up a generated voltage when started, automatic excitation apparatus including a plurality of hard vacuum controllable electron discharge tubes energized from said output circuit for providing a controllable component of leading current in said output circuit for excitation of the generator, and means acting when said automatic excitation apparatus becomes effective to provide excitation for the generator for disconnecting said starting capacitor from the output circuit.

26. Excitation apparatus of the character described for alternating current generators supplying current through rectifiers to a direct current output cicuit comprising in combination, means including a relatively large inductance and a plurality of controllable power tubes for receiving energy from the output circuit of the generator and returning thereto a component of leading current for excitation of the generator, said component of said leading current and excitation of said generator varying with the leading phase angle of the conduction periods of said power tubes with respect to the output voltage of the generator, and automatic voltage regulating means including a torque motor excited from the direct current output circuit and a phase shifting device excited from the alternating voltage output of the generator for controlling the phase angle of the conduction periods of said tubes and excitation of the generator to maintain an essentially uniform voltage for said direct current output circuit.

27. Excitation apparatus of the character described for an alternating current generator having a permanent magnet rotor cooperating with a stator winding to provide a generated voltage dependent upon the magneto-motive-force of the rotor and also the component of leading current in the output circuit connected to said stator winding, said excitation apparatus comprising in combination with said output circuit, an inductor of relatively large inductance, a plurality of controllable electron discharge tubes each having a control element capable of stopping as well as starting conduction through the tube for positive anode voltages, a circuit organization interconnecting the anode circuits of said tubes with said inductance and said output circuit of the generator for rectifying current supplied from the output circuit to the inductor and enabling said inductor to supply blocks of current of alternate polarity to said output circuit, and grid control means including changeable phase shifting circuit elements for governing the duration and phase relation of the conduction periods of said tubes, said grid control means acting to initiate conduction through each tube in turn at a relatively large leading phase angle with respect to the voltage in said output circuit and maintain each tube conductive in turn approximately until conduction through the next tube is started.

DONALD V. EDWARDS.

REFERENCES CITED

The following references are of record in the file of this patent:

UNITED STATES PATENTS

| Number | Name | Date |
|---|---|---|
| 2,415,022 | Morrison | Jan. 28, 1947 |

FOREIGN PATENTS

| Number | Country | Date |
|---|---|---|
| 479,260 | Great Britain | Feb. 2, 1938 |